United States Patent
Nowak et al.

(10) Patent No.: US 10,507,380 B2
(45) Date of Patent: Dec. 17, 2019

(54) MULTI-STAGE PROGRESSIVE RISK MINI GAME

(71) Applicant: Zynga Inc., San Francisco, CA (US)

(72) Inventors: James Brett Nowak, San Francisco, CA (US); Shawn Carnes, San Francisco, CA (US); Michael Kane, San Francisco, CA (US); Edward LeBreton, IV, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 0 days.

(21) Appl. No.: 16/051,159

(22) Filed: Jul. 31, 2018

(65) Prior Publication Data

US 2018/0353846 A1 Dec. 13, 2018

Related U.S. Application Data

(63) Continuation of application No. 13/708,568, filed on Dec. 7, 2012.
(Continued)

(51) Int. Cl.
*A63F 13/00* (2014.01)
*A63F 13/792* (2014.01)
*G07F 17/32* (2006.01)

(52) U.S. Cl.
CPC ............ *A63F 13/00* (2013.01); *A63F 13/792* (2014.09); *G07F 17/3225* (2013.01);
(Continued)

(58) Field of Classification Search
CPC ..... A63F 13/00; A63F 13/792; G07F 17/3225; G07F 17/3244; G07F 17/322; G07F 17/3267
See application file for complete search history.

(56) References Cited

U.S. PATENT DOCUMENTS 7,285,049 B1 * 10/2007 Luciano, Jr. .......... G07F 17/323
463/16
2002/0135129 A1 9/2002 Tarantino
(Continued)

OTHER PUBLICATIONS

"U.S. Appl. No. 13/708,568 , Response filed Nov. 7, 2013 to Non Final Office Action dated Aug. 7, 2013", 12 pgs.
(Continued)

*Primary Examiner* — Corbett B Coburn
(74) *Attorney, Agent, or Firm* — Schwegman Lundberg & Woessner, P.A.

(57) ABSTRACT

A method of rewarding players for performing actions with respect to computer-implemented games is disclosed. An action by a user with respect to a computer game is detected. It is identified that the performing of the action by the user qualifies the user to participate in a mini game, the mini game having a plurality of stages. A reward to associate with a winning by the user of a stage of the plurality of stages is determined. The winning by the user of the stage of the plurality of stages is detected. Under certain circumstances, the user is provided with an option to participate in the additional stage of the plurality of stages in exchange for the user not receiving the reward, the additional stage of the plurality of stages being associated with an additional reward, the additional reward being greater than the reward.

17 Claims, 17 Drawing Sheets

Related U.S. Application Data

(60) Provisional application No. 61/569,190, filed on Dec. 9, 2011.

(52) U.S. Cl.
CPC ...... *G07F 17/3244* (2013.01); *G07F 17/3262* (2013.01); *G07F 17/3267* (2013.01)

(56) References Cited

U.S. PATENT DOCUMENTS

| | | | |
|---|---|---|---|
| 2003/0216167 A1 | 11/2003 | Gauselmann | |
| 2006/0116188 A1 | 6/2006 | Blankstein | |
| 2006/0282323 A1* | 12/2006 | Walker | G06Q 30/0212 705/14.14 |
| 2007/0026916 A1* | 2/2007 | Juds | G07F 7/005 463/1 |
| 2007/0060249 A1* | 3/2007 | Gomez | G07F 17/32 463/16 |
| 2008/0070658 A1 | 3/2008 | Labgold et al. | |
| 2008/0108436 A1 | 5/2008 | Oberberger | |
| 2009/0280883 A1* | 11/2009 | Haveson | G07F 17/32 463/9 |
| 2010/0227675 A1 | 9/2010 | Luxton et al. | |
| 2011/0287828 A1* | 11/2011 | Anderson | G07F 17/32 463/25 |

OTHER PUBLICATIONS

"U.S. Appl. No. 13/708,568 , Response filed Dec. 3, 2013 to Non Final Office Action dated Aug. 7, 2013", 12 pgs.
"U.S. Appl. No. 13/708,568, Appeal Brief filed Jan. 19, 2017", 36 pgs.
"U.S. Appl. No. 13/708,568, Appeal Decision mailed May 14, 2018", 10 pgs.
"U.S. Appl. No. 13/708,568, Final Office Action dated Feb. 23, 2015", 7 pgs.
"U.S. Appl. No. 13/708,568, Final Office Action dated Oct. 19, 2016", 8 pgs.
"U.S. Appl. No. 13/708,568, Final Office Action dated Dec. 30, 2013", 10 pgs.
"U.S. Appl. No. 13/708,568, Non Final Office Action dated Aug. 7, 2013", 13 pgs.
"U.S. Appl. No. 13/708,568, Non Final Office Action dated Sep. 15, 2014", 5 pgs.
"U.S. Appl. No. 13/708,568, Non Final Office Action dated Sep. 29, 2015". 8 pgs.
"U.S. Appl. No. 13/708,568, Reply Brief filed May 8, 2017", 16 pgs.
"U.S. Appl. No. 13/708,568, Response filed Jan. 12, 2015 to Non-Final Office Action dated Sep. 15, 2014", 18 pgs.
"U.S. Appl. No. 13/708,568, Response filed Sep. 2, 2015 to Final Office Action dated Feb. 23, 2015", 18 pgs.
"U.S. Appl. No. 13/708,568, Response filed Apr. 30, 2014 to Final Office Action dated Dec. 30, 2013", 11 pgs.
"U.S. Appl. No. 13/708,568, Response filed Sep. 19, 2016 to Final Office Action dated Sep. 29, 2015 and Decision on Pre-Appeal Brief mailed Apr. 18, 2016", 14 pgs.
"U.S. Appl. No. 13 708,568, Notice of Allowance dated Jul. 17, 2019", 5 pgs.

* cited by examiner

1100

High/Low Casino Gold Game — zyngacasino

Layout: 5 card slots across 4 tiers

Goal: Guess 4 H/L in a tier to win the row and collect the tier's prize

Must guess 16 in a tow to get top prize (Tier 4)

- Each tier should significantly increase the prize amount
- If 1 CG = 40K chips, then tier 2 prize should be slightly negative EV
- Prize values below are a suggested starting point if the game cost was 15 CG or higher (12.5 CG is 500K chips)

Tier 4 Prize: $50M chips
Tier 3 Prize: $5M chips
Tier 2 Prize: $500K chips
Tier 1 Prize: $50K chips

FIG. 11

FIG. 13

MULTI-STAGE PROGRESSIVE RISK MINI GAME

CROSS-REFERENCE TO RELATED APPLICATIONS

This application is a continuation of U.S. patent application Ser. No. 13/708,568, filed on Dec. 7, 2012, which claims the benefit of U.S. Provisional Application No. 61/569,190, filed on Dec. 9, 2011, which applications are incorporated herein by reference in their entireties.

TECHNICAL FIELD

This application relates generally to the technical field of incentivizing users to participate in computer games, and, in one specific example, to providing a player of a computer game with an option to play a progress-risk mini game in response to the player purchasing virtual currency associated with the computer game.

BACKGROUND

In many games, there is a virtual world or some other imagined playing space where a player/user of the game controls one or more player characters (herein "character," "player character," or "PC"). Player characters can be considered in-game representations of the controlling player. As used herein, the terms "player," "user," "entity," and "friend" may refer to the in-game player character controlled by that player, user, entity, or friend, unless context suggests otherwise. The game display can display a representation of the player character. A game engine accepts inputs from the player, determines player character actions, decides outcomes of events, and presents the player with a game display illuminating what happened. In some games, there are multiple players, wherein each player controls one or more player characters.

In many computer games, there are various types of in-game assets (aka "rewards" or "loot") that a player character can obtain within the game. For example, a player character may acquire game points, gold coins, experience points, character levels, character attributes, virtual cash, game keys, or other in-game items of value. In many computer games, there are also various types of in-game obstacles that a player must overcome to advance within the game. In-game obstacles can include tasks, puzzles, opponents, levels, gates, actions, and so forth. In some games, a goal of the game may be to acquire certain in-game assets, which can then be used to complete in-game tasks or to overcome certain in-game obstacles. For example, a player may be able to acquire a virtual key (i.e., the in-game asset) that can then be used to open a virtual door (i.e., the in-game obstacle).

An electronic social networking system typically operates with one or more social networking servers providing interaction between users such that a user can specify other users of the social networking system as "friends." A collection of users and the "friend" connections between users can form a social graph, which can be traversed to find second, third, and more remote connections between users, much like a graph of nodes connected by edges can be traversed.

Many online computer games are operated on an online social network. Such a network allows both users and other parties to interact with the computer games directly, whether to play the games or to retrieve game- or user-related information. Internet users may maintain one or more accounts with various service providers, including, for example, online game networking systems and online social networking systems. Online systems can typically be accessed using browser clients (e.g., Firefox, Chrome, Internet Explorer).

In many computer games, there are various types of in-game actions that a player character can take within the game. For example, a player character in an online role-playing game may be able to interact with other player characters, build a virtual house, attack enemies, go on a quest, go to a virtual store to buy/sell virtual items, and the like. A player character in an online poker game may be able to play at specific tables, place bets of virtual currency for certain amounts, play or fold certain hands, play in an online poker tournament, and so forth.

BRIEF DESCRIPTION OF THE DRAWINGS

Some embodiments are illustrated by way of example and not limitation in the figures of the accompanying drawings in which:

FIG. 11 is a screenshot illustrating an example embodiment of a user interface of a "High/Low Casino Gold" mini game;

FIG. 13 is a screenshot illustrating an example embodiment of a user interface of the High/Low Casino Gold game in which the last card of the previous tier becomes the first card of the new tier;

DETAILED DESCRIPTION

In the following description, for purposes of explanation, numerous specific details are set forth in order to provide an understanding of various embodiments of the present subject matter. It will be evident, however, to those skilled in the art that various embodiments may be practiced without these specific details.

In various embodiments, methods and systems of rewarding players for performing actions with respect to computer-implemented games is disclosed. An action by a user with respect to a computer game is detected. It is identified that the performing of the action by the user qualifies the user to participate in a mini game, the mini game having a plurality of stages. A reward to associate with a winning by the user of a stage of the plurality of stages is determined. The winning by the user of the stage of the plurality of stages is detected. Based on the detecting of the winning of the stage of the plurality of stages by the user, the user is provided with an option to participate in the additional stage of the plurality of stages in exchange for the user not receiving the reward, the additional stage of the plurality of stages being associated with an additional reward, the additional reward being greater than the reward.

Figure 1:
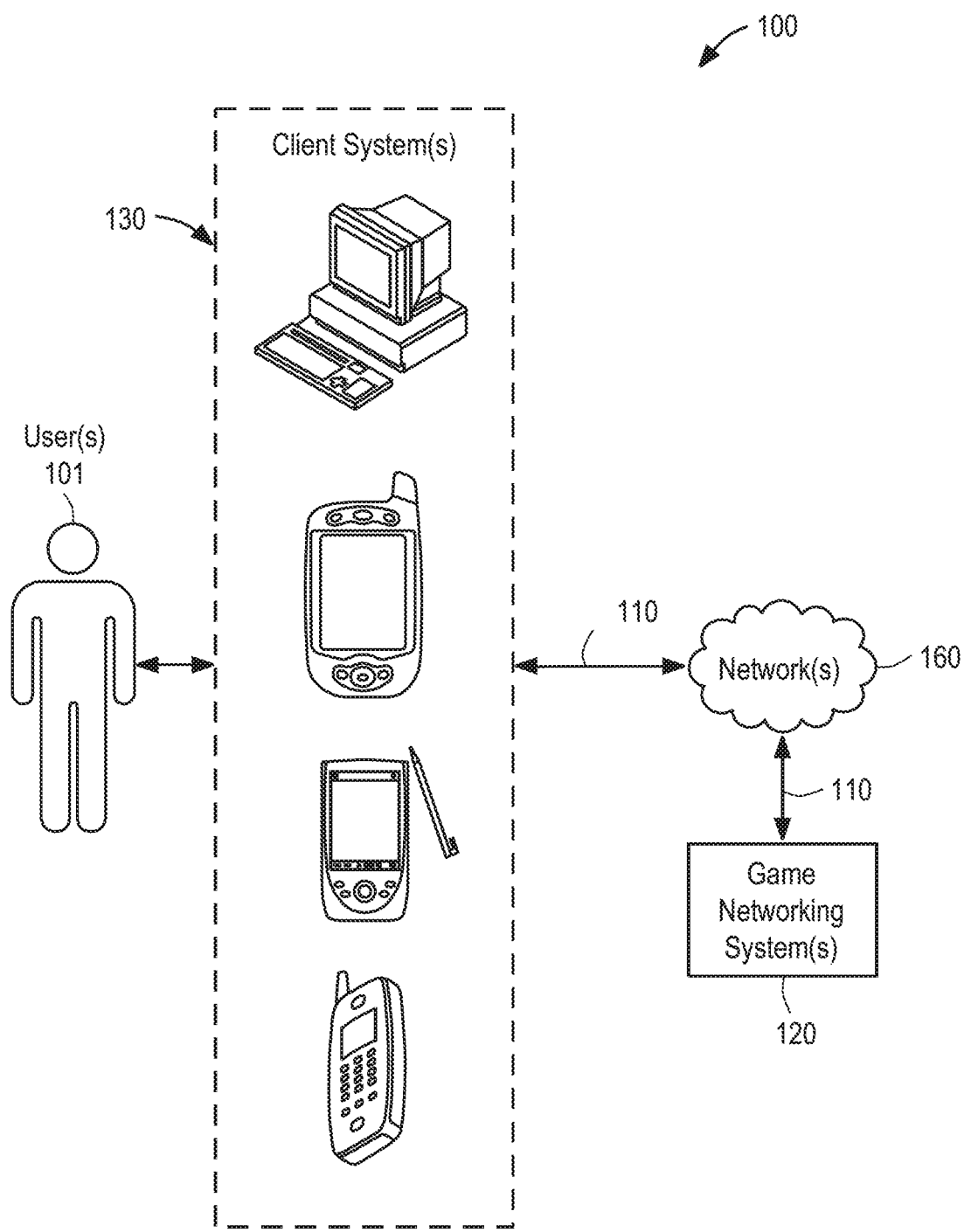
FIG. 1 is a block diagram illustrating an example of a system for implementing various disclosed embodiments.

FIG. 1 is a block diagram illustrating an example of a system 100 for implementing various disclosed embodiments. In particular embodiments, system 100 comprises user(s) 101, game networking system 120, client system 130, and network 160. The one or more users(s) 101 may also be referred to as one or more player(s); and the player(s) may also be referred to as the user(s) 101. The components of system 100 can be connected to each other in any suitable configuration, using any suitable type of connection. The components may be connected directly or over a network 160, which may be any suitable network. For example, one or more portions of network 160 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Game networking system 120 is a network-addressable computing system that can host one or more online games. Game networking system 120 can generate, store, receive, and transmit game-related data, such as, for example, game account data, game input, game state data, and game displays. Game networking system 120 can be accessed by the other components of system 100 either directly or via network 160. Player 101 may use client system 130 to access, send data to, and receive data from game networking system 120. Client system 130 can access game networking system 120 directly, via network 160, or via a third-party system. Client system 130 can be any suitable computing device, such as a personal computer, laptop, cellular phone, smart phone, computing tablet, and the like.

Although FIG. 1 illustrates a particular number of players 101, game networking systems 120, client systems 130, and networks 160, this disclosure contemplates any suitable number of players 101, game networking systems 120, client systems 130, and networks 160. Although FIG. 1 illustrates a particular arrangement of player 101, game networking system 120, client system 130, and network 160, this disclosure contemplates any suitable arrangement of player 101, game networking system 120, client system 130, and network 160.

The components of system 100 may be connected to each other using any suitable connections 110. For example, suitable connections 110 include wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) connections. In particular embodiments, one or more connections 110 each include one or more of an ad hoc network, an intranet, an extranet, a VPN, a LAN, a WLAN, a WAN, a WWAN, a MAN, a portion of the Internet, a portion of the PSTN, a cellular telephone network, or another type of connection, or a combination of two or more such connections. Connections 110 need not necessarily be the same throughout system 100. One or more first connections 110 may differ in one or more respects from one or more second connections 110. Although FIG. 1 illustrates particular connections between player 101, game networking system 120, client system 130, and network 160, this disclosure contemplates any suitable connections between player 101, game networking system 120, client system 130, and network 160. As an example and not by way of limitation, in particular embodiments, client system 130 may have a direct connection to game networking system 120, thereby bypassing network 160.

Online Games and Game Systems

Game Networking Systems

In an online computer game, a game engine manages the game state of the game. Game state comprises all game play parameters, including player character state, non-player character (NPC) state, in-game object state, game world state (e.g., internal game clocks, game environment), and other game play parameters. Each player 101 controls one or more player characters (PCs). The game engine controls all other aspects of the game, including NPCs and in-game objects. The game engine also manages game state, including player character state for currently active (e.g., online) and inactive (e.g., offline) players.

An online game can be hosted by game networking system 120, which can be accessed using any suitable connection with a suitable client system 130. A player may have a game account on game networking system 120, wherein the game account can contain a variety of information associated with the player (e.g., the player's personal information, financial information, purchase history, player character state, game state, etc.). In some embodiments, a player may play multiple games on game networking system 120, which may maintain a single game account for the player with respect to all the games, or multiple individual game accounts for each game with respect to the player. In some embodiments, game networking system 120 can assign a unique identifier to each player 101 of an online game hosted on game networking system 120. Game networking system 120 can determine that a player 101 is accessing the online game by reading the user's cookies, which may be appended to Hypertext Transfer Protocol (HTTP) requests transmitted by client system 130, and/or by the player 101 logging onto the online game.

In particular embodiments, player 101 may access an online game and control the game's progress via client system 130 (e.g., by inputting commands to the game at the client device). Client system 130 can display the game interface, receive inputs from player 101, transmit user inputs or other events to the game engine, and receive instructions from the game engine. The game engine can be executed on any suitable system (such as, for example, client system 130, or game networking system 120). As an example and not by way of limitation, client system 130 can download client components of an online game, which are executed locally, while a remote game server, such as game networking system 120, provides backend support for the client components and may be responsible for maintaining application data of the game, processing the inputs from the player, updating and/or synchronizing the game state based on the game logic and each input from the player, and transmitting instructions to client system 130. As another example and not by way of limitation, each time player 101 provides an input to the game through the client system 130 (such as, for example, by typing on the keyboard or clicking the mouse of client system 130), the client components of the game may transmit the player's input to game networking system 120.

In many computer games, there are various types of in-game assets (aka "rewards" or "loot") that a player character can obtain within the game. For example, a player character may acquire game points, gold coins, experience points, character levels, character attributes, virtual cash, game keys, or other in-game items of value. In many computer games, there are also various types of in-game obstacles that a player must overcome to advance within the game. In-game obstacles can include tasks, puzzles, opponents, levels, gates, actions, and so forth. In some games, a goal of the game may be to acquire certain in-game assets, which can then be used to complete in-game tasks or to overcome certain in-game obstacles. For example, a player may be able to acquire a virtual key (i.e., the in-game asset) that can then be used to open a virtual door (i.e., the in-game obstacle).

Game Systems, Social Networks, and Social Graphs

In an online multiplayer game, players may control player characters (PCs) and a game engine controls non-player characters (NPCs) and game features. The game engine also manages player character state and game state and tracks the state for currently active (i.e., online) players and currently inactive (i.e., offline) players. A player character can have a set of attributes and a set of friends associated with the player character. As used herein, the term "player character state" can refer to any in-game characteristic of a player character, such as location, assets, levels, condition, health, status, inventory, skill set, name, orientation, affiliation, specialty, and so on. Player characters may be displayed as graphical avatars within a user interface of the game. In other implementations, no avatar or other graphical representation of the player character is displayed. Game state encompasses the notion of player character state and refers to any parameter value that characterizes the state of an in-game element, such as a non-player character, a virtual object (such as a wall or castle), and so forth. The game engine may use player character state to determine the outcome of game events, sometimes also considering set or random variables. Generally, a player character's probability of having a more favorable outcome is greater when the player character has a better state. For example, a healthier player character is less likely to die in a particular encounter relative to a weaker player character or non-player character.

In some embodiments, the game engine can assign a unique client identifier to each player.

In particular embodiments, player 101 may access particular game instances of an online game. A game instance is a copy of a specific game play area that is created during runtime. In particular embodiments, a game instance is a discrete game play area where one or more players 101 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables. A game instance may be exclusive (i.e., accessible by specific players) or non-exclusive (i.e., accessible by any player). In particular embodiments, a game instance is populated by one or more player characters controlled by one or more players 101 and one or more in-game objects controlled by the game engine. When accessing an online game, the game engine may allow player 101 to select a particular game instance to play from a plurality of game instances. Alternatively, the game engine may automatically select the game instance that player 101 will access. In particular embodiments, an online game comprises only one game instance that all players 101 of the online game can access.

In particular embodiments, a specific game instance may be associated with one or more specific players. A game instance is associated with a specific player when one or more game parameters of the game instance are associated with the specific player. As an example and not by way of limitation, a game instance associated with a first player may be named "First Player's Play Area." This game instance may be populated with the first player's PC and one or more in-game objects associated with the first player. In particular embodiments, a game instance associated with a specific player may only be accessible by that specific player. As an example and not by way of limitation, a first player may access a first game instance when playing an online game, and this first game instance may be inaccessible to all other players. In other embodiments, a game instance associated with a specific player may be accessible by one or more other players, either synchronously or asynchronously with the specific player's game play. As an example and not by way of limitation, a first player may be associated with a first game instance, but the first game instance may be accessed by all first-degree friends in the first player's social network. In particular embodiments, the game engine may create a specific game instance for a specific player when that player accesses the game. As an example and not by way of limitation, the game engine may create a first game instance when a first player initially accesses an online game, and that same game instance may be loaded each time the first player accesses the game. As another example and not by way of limitation, the game engine may create a new game instance each time a first player accesses an online game, wherein each game instance may be created randomly or selected from a set of predetermined game instances. In particular embodiments, the set of in-game actions available to a specific player may be different in a game instance that is associated with that player compared to a game instance that is not associated with that player. The set of in-game actions available to a specific player in a game instance associated with that player may be a subset, superset, or independent of the set of in-game actions available to that player in a game instance that is not associated with him. As an example and not by way of limitation, a first player may be associated with Blackacre Farm in an online farming game. The first player may be able to plant crops on Blackacre Farm. If the first player accesses a game instance associated with another player, such as Whiteacre Farm, the game engine may not allow the first player to plant crops in that game instance. However, other in-game actions may be available to the first player, such as watering or fertilizing crops on Whiteacre Farm.

In particular embodiments, a game engine can interface with a social graph. Social graphs are models of connections between entities (e.g., individuals, users, contacts, friends, players, player characters, non-player characters, businesses, groups, associations, concepts, etc.). These entities are considered "users" of the social graph, as such, the terms "entity" and "user" may be used interchangeably when referring to social graphs herein. A social graph can have a node for each entity and edges to represent relationships between entities. A node in a social graph can represent any entity. In particular embodiments, a unique client identifier can be assigned to each user in the social graph. This disclosure assumes that at least one entity of a social graph is a player or player character in an online multiplayer game, though this disclosure contemplates any suitable social graph users.

The minimum number of edges required to connect a player (or player character) to another user is considered the degree of separation between them. For example, where the player and the user are directly connected (one edge), they are deemed to be separated by one degree of separation. The user would be a so-called "first-degree friend" of the player. Where the player and the user are connected through one other user (two edges), they are deemed to be separated by two degrees of separation. This user would be a so-called "second-degree friend" of the player. Where the player and the user are connected through N edges (or N−1 other users), they are deemed to be separated by N degrees of separation. This user would be a so-called "Nth-degree friend." As used herein, the term "friend" means only first-degree friends, unless context suggests otherwise.

Within the social graph, each player (or player character) has a social network. A player's social network includes all users in the social graph within Nmax degrees of the player, where Nmax is the maximum degree of separation allowed by the system managing the social graph (such as, for example, game networking system 120). In one embodiment, Nmax equals 1, such that the player's social network includes only first-degree friends. In another embodiment, Nmax is unlimited and the player's social network is coextensive with the social graph.

In particular embodiments, the social graph is managed by game networking system 120, which is managed by the game operator. In other embodiments, the social graph is part of a social networking system managed by a third-party (e.g., Facebook, Friendster, Myspace). In yet other embodiments, player 101 has a social network on both game networking system 120 and social networking system, wherein player 101 can have a social network on the game networking system 120 that is a subset, superset, or independent of the player's social network on social networking system. In such combined systems, game network system 120 can maintain social graph information with edge type attributes that indicate whether a given friend is an "in-game friend," an "out-of-game friend," or both. The various embodiments disclosed herein are operable when the social graph is managed by the social networking system, game networking system 120, or both.

Figure 2:
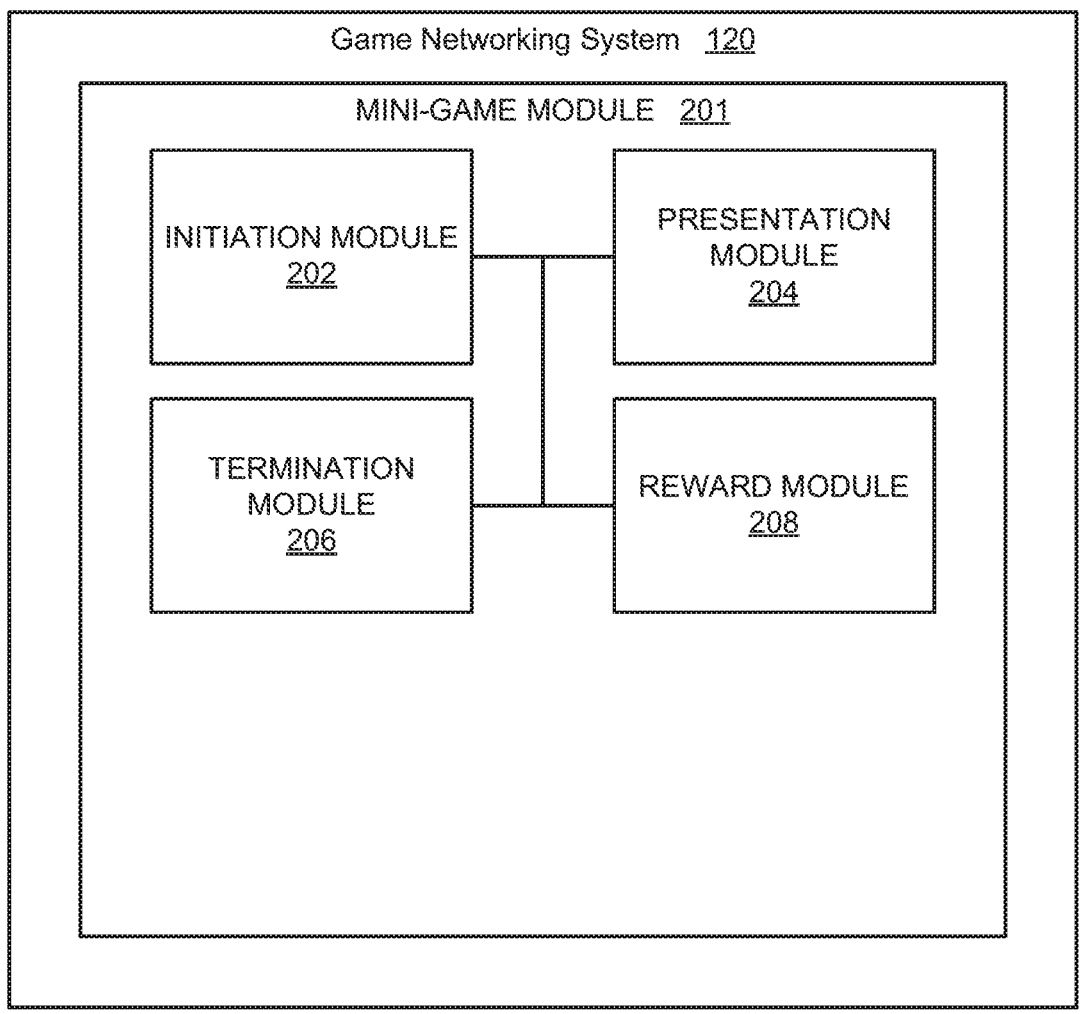
FIG. 2 is a block diagram illustrating an example mini-game module of the system that is configured to present a player with an option to play a mini game.

FIG. 2 is a block diagram illustrating an example mini-game module 201 of the game networking system 120 that is configured to present a player with an option to play a mini game. A mini game is a game of the game networking system that is presented as a secondary game to a player who uses the game networking system primarily to play a primary game. For example, a mini game may be a high-low style card game that is presented as a secondary game to a player who is currently playing (or usually plays) a Texas Hold 'Em poker game as a primary game. In various embodiments, a mini game may have a shorter duration than a primary game. Or the mini game may be overlaid temporarily over the primary game. Or the mini game may be a simplified version of a primary game. The mini game may be optional; for example, a player may be presented with an option to participate in the mini game. The mini game may then be presented to the player based on whether the player accepts or declines the option.

As depicted, the mini-game module 201 includes an initiation module 202 that is configured to initiate the mini game. The initiation module 202 may determine whether to initiate the mini game based on various factors. In various embodiments, the determination to initiate the mini-game may be based on a detection that the player of a game (e.g., a primary game) of the game networking system has performed an action with respect to the game or the game networking system 120. Such actions may include purchasing a product that is associated with the game networking system (e.g., game cards, apparel, and so on), purchasing virtual currency, spending virtual currency, playing a game on the game networking system, accessing a feature of a game, performing an action within a primary game, and so on. For example, the determination may be based on a detection that the player has purchased an in-game asset (e.g., gold coins).

As depicted, the mini-game module 201 includes a presentation module 204 that is configured to present one or more user interfaces pertaining to a mini game to a player of the game networking system. Examples of such user interfaces are described below with respect to FIGS. 7-16.

As depicted, the mini-game module 201 includes a termination module 206 that is configured to determine when to terminate a mini game. The termination module 206 may make a determination to terminate a mini game based on various factors. Such factors may include receiving a notification that the player wishes to terminate the mini game or a determination that the player has lost a stage of the mini game.

As depicted, the mini-game module 201 includes a reward module 208 that is configured to determine a reward to the player based on the player's actions with respect to the mini game. For example, the reward module 208 may make a determination to provide a player with a reward based on the player completing one or more stages of the mini game. Or the reward module 208 may make a determination to provide no rewards to the player based on the player failing to win a stage of the mini game. The reward module 208 may also determine a magnitude of a reward to provide to the user based on various factors. For example, the reward module 208 may determine a magnitude of an award based on a magnitude of a purchase by the player (e.g., of virtual currency associated with the game networking system 120b).

Figure 3:
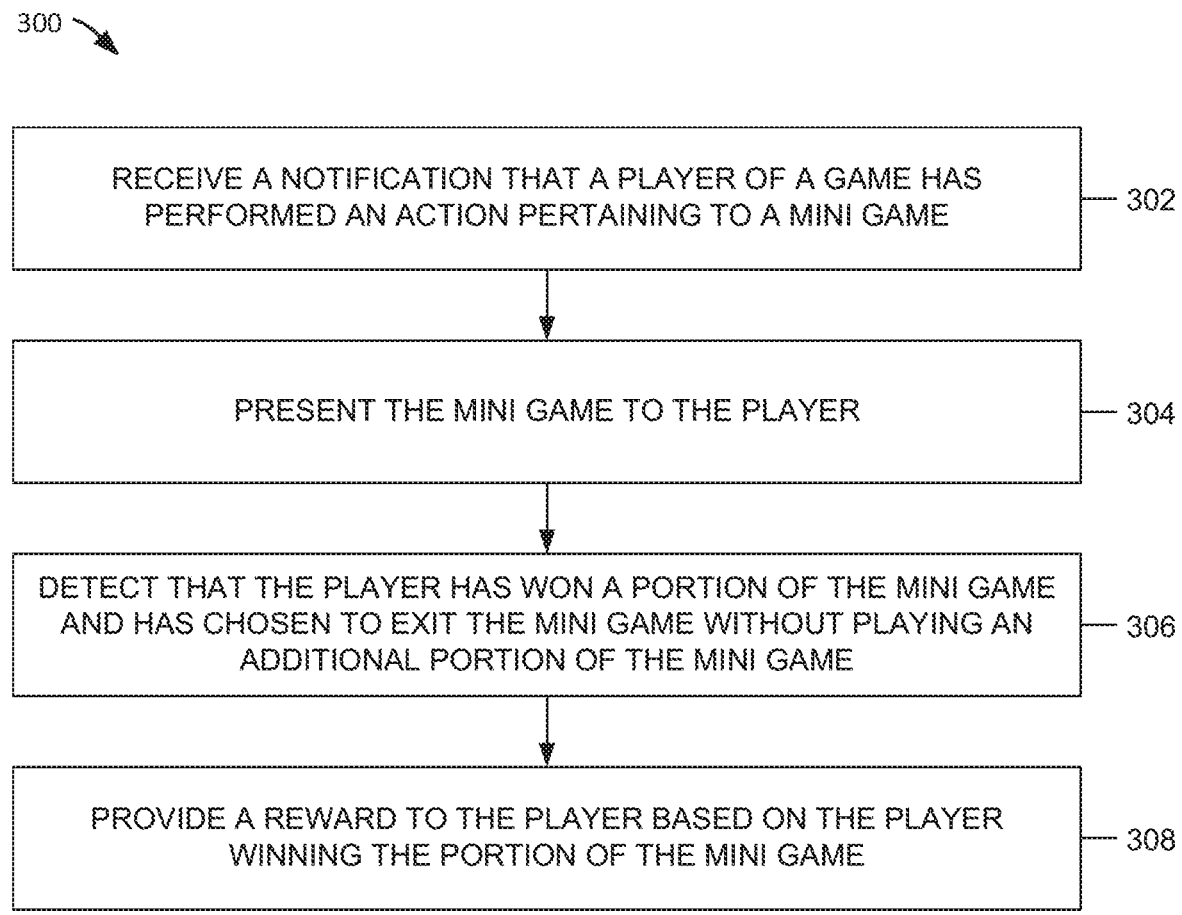
FIG. 3 is a flow chart illustrating an example embodiment of a method of providing a reward to a player based on the player winning a portion of a mini game.

FIG. 3 is a flow chart of an example embodiment of a method 300 of providing a reward to a player based on the player winning a portion of a mini game. In various embodiments, the method 300 is performed by the mini-game module 201 or one or more of its sub-modules. At operation 302, the initiation module 202 receives a notification that a player of a game (e.g., a primary game) has performed an action pertaining to a mini game. For example, the initiation module 202 may determine that the player has purchased virtual currency (e.g., gold coins). Additionally, the initiation module 202 may determine that the purchase by the player of virtual currency pertains to a mini game (e.g., a high-low mini game). For example, the initiation module 202 may determine that the high-low mini game is to be presented to a player based on a purchase by the player having an amount that exceeds a threshold.

At operation 304, the presentation module 204 presents the mini game to the player. For example, the presentation module 204 presents a user interface to the player that enables the player to play the mini game. The user interface may include various user interface controls, such as the controls depicted with respect to FIGS. 8-14. The presentation module 204 may communicate with a logic module associated with the mini game. The logic module may be integrated into the game networking system 120b. The logic module may implement the rules and flow of the game and communicate with the presentation module 204 to present or collect information from the user that is necessary for playing the game.

At operation 306, the termination module 206 may detect that the player has won a portion of the mini game and has chosen to exit the mini game without playing an additional portion of the mini game. For example, the termination module 206 may detect that a player has won a first stage of multiple stages of the mini game. Or the termination module 206 may detect that the player wishes to exit the mini game regardless of whether the player won a portion of the mini game. The termination module 206 may then terminate the mini game based on the mini game being an optional mini game. In various embodiments, the terminating of the mini game may include the termination module 206 instructing the presentation module 204 to close user interface windows associated with the mini game such that the player may return to a user interface of a primary game.

At operation 308, the reward module 208 provides a reward to the player based on the player winning a portion of the min game. For example, if the player elects to exit the mini game after winning a portion of the mini game (and before electing to play an additional portion of the mini game), the reward module 208 may provide a reward to the player that is associated with the portion of the mini game that the player completed.

Figure 4:
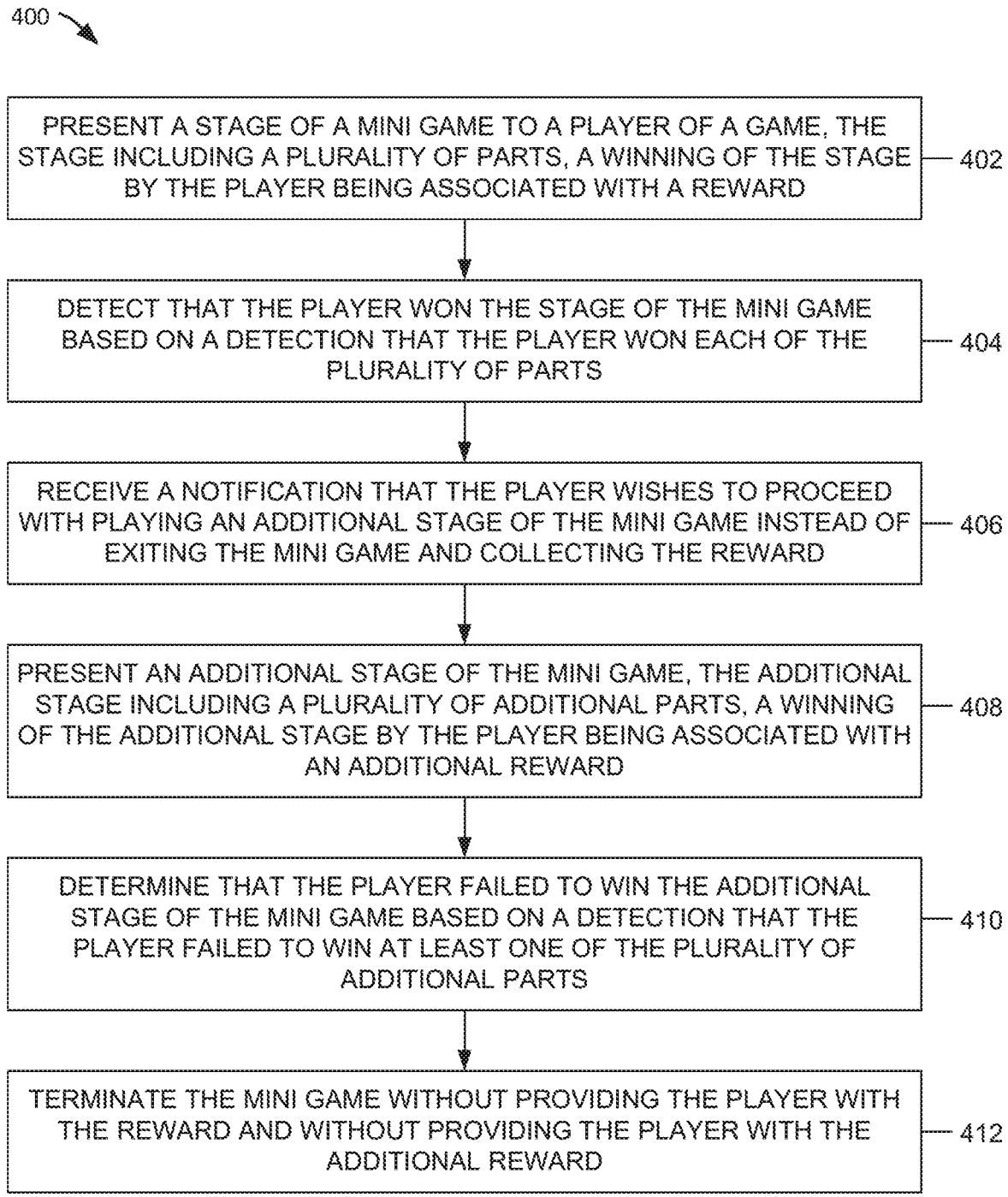
FIG. 4 is a flow chart illustrating an example embodiment of a method of terminating a mini game without providing a player with a reward.

FIG. 4 is a flow chart of an example embodiment of a method 400 of terminating a mini game without providing a player with a reward. In various embodiments, the method 400 is performed by the mini-game module 201 or one or more of its sub-modules. At operation 402, the presentation module 204 presents a stage of a mini game to a player of a game. The presenting of the stage may include presenting a user interface in communication with a logic module of the game networking system 120b that enables a player to play the stage of the mini game. Here, a winning of the stage may by the player may be associated with a reward, and the presentation module 204 may notify the player of a possibility of receiving the reward. Additionally, a stage may have multiple parts. For example, if the mini game is a card game, each part of a stage of the card game may be a hand of the card game. A stage may include a number of parts (e.g., four parts). In various embodiments, if the player elects not to play any stages of the mini game, the termination module 206 may terminate the mini game. However, in this case, the initiation module 202 may restart the mini game at a later time (e.g., the next time the player accesses a primary game), providing the player with another chance to play the mini game.

At operation 404, the reward module 208 may detect that the player won the stage of the mini game. The detection that the player won the stage of the mini game may be based on a detection that the player won each of the plurality of parts of the stage of the mini game. For example, if the mini game is a card game, the reward module 208 may detect that the player won each of four hands of a card game that comprise a stage of the card game.

At operation 406, the presentation module 206 may receive a notification that the player wishes to proceed with playing an additional stage of the mini game instead of exiting the mini game and collecting the reward associated with the winning of the stage of the mini game. For example, the presentation module 206 may present a user interface that notifies that user of an option to play the additional stage, the condition that the player risk losing the reward associated with winning the stage, or a notification of an award that is associated with the player completing an additional stage of the mini game. The player may then activate a user interface control of the user interface to accept or refuse the option.

At operation 408, the presentation module 206 may present an additional stage of the mini game to the player of the game. The additional stage may include a plurality of additional parts. A winning of the additional stage of the player may be associated with an additional reward.

At operation 410, the reward module 208 may determine that the player failed to win the additional stage of the mini game. In various embodiments, the reward module 208 may make the determination based on the failure of the player to win at least one of the plurality of additional parts of the mini game.

At operation 412, the termination module 206 terminates the mini game. In various embodiments, the reward module 208 determines not to provide the player with reward and not to provide the player with the additional reward based on the determination that the player failed to win the additional stage of the mini game. Thus, the player may not receive a reward when the mini game is terminated.

Figure 5:
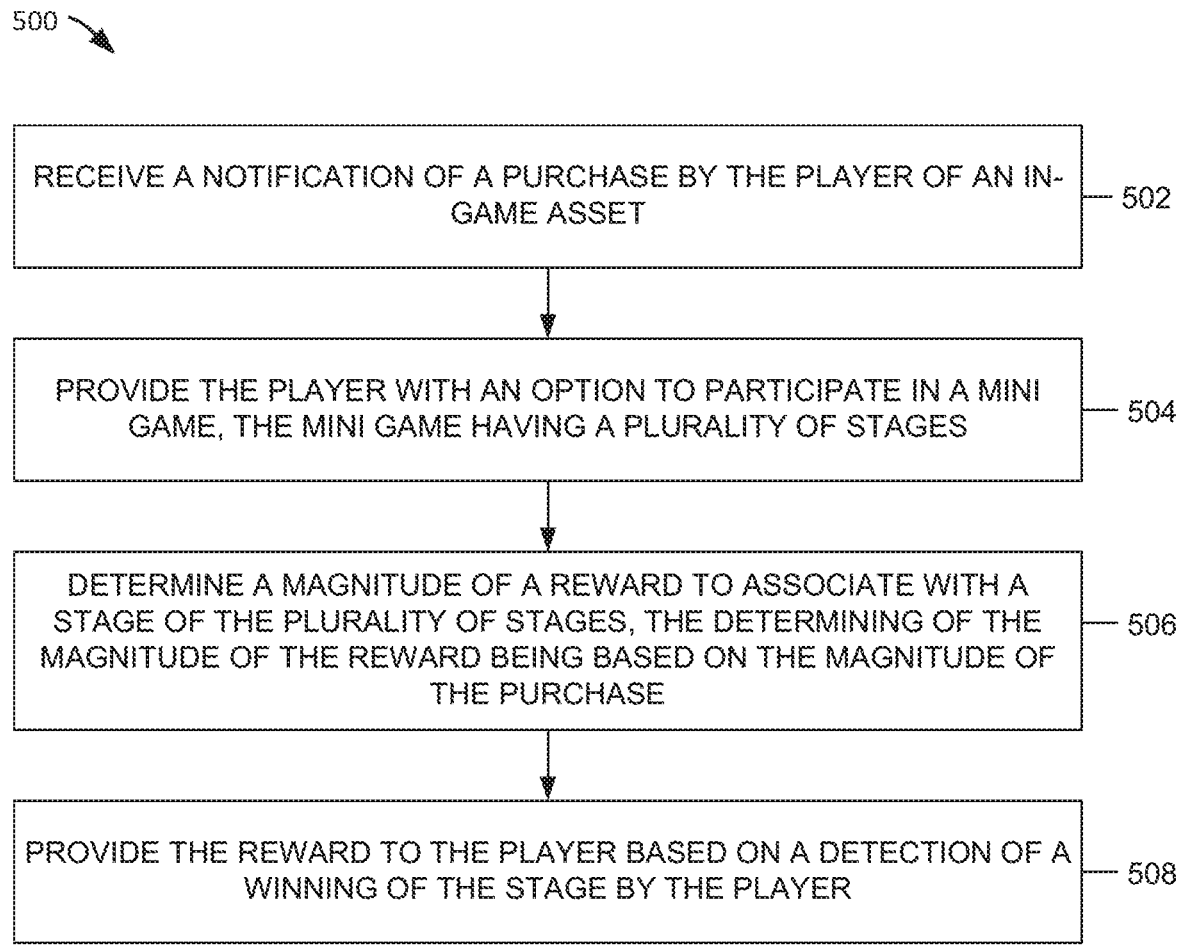
FIG. 5 is a flow chart illustrating an example embodiment of a method of determining a magnitude of a reward to associate with a stage of a mini game based on a magnitude of a purchase by a player of a game of a game networking system.

FIG. 5 is a flow chart of an example embodiment of a method 500 of determining a magnitude of a reward to associate with a stage of a mini game based on a magnitude of a purchase by a player of a game of a game networking system. In various embodiments, the method 500 is performed by the mini-game module 201 or one or more of its sub-modules. At operation 502, the initiation module 202 receives a notification of a purchase of a player of a game networking system. For example, the initiation module 202 receives a notification that a player purchased an in-game asset (e.g., gold coins) associated with the game networking system.

At operation 504, the presentation module 204 provides the players with an option to participate in a mini game. For example, the presentation module 204 presents a user interface that includes information about the mini game and user interface controls that enable the user to accept or refuse the option to play the mini game. Here, the mini game has a plurality of stages, and the user interface may include information about the stages.

At operation 506, the reward module 208 determines a magnitude of a reward to be associated with a stage of the plurality of stages. The determining of the magnitude of the reward may be based on the magnitude of the purchase. For example, if a player makes $1 purchase of virtual currency, the reward module 208 may determine that a reward associated with a stage of the mini game may be 1,000 poker chips, whereas if the player makes a $100 purchase of virtual currency, the reward module 208 may determined that the reward associated with the stage of the mini game may be 1,000,000 poker chips.

At operation 508, the reward module 208 provides the reward to the player based on a detection of a winning of the stage by the player.

Figure 6:
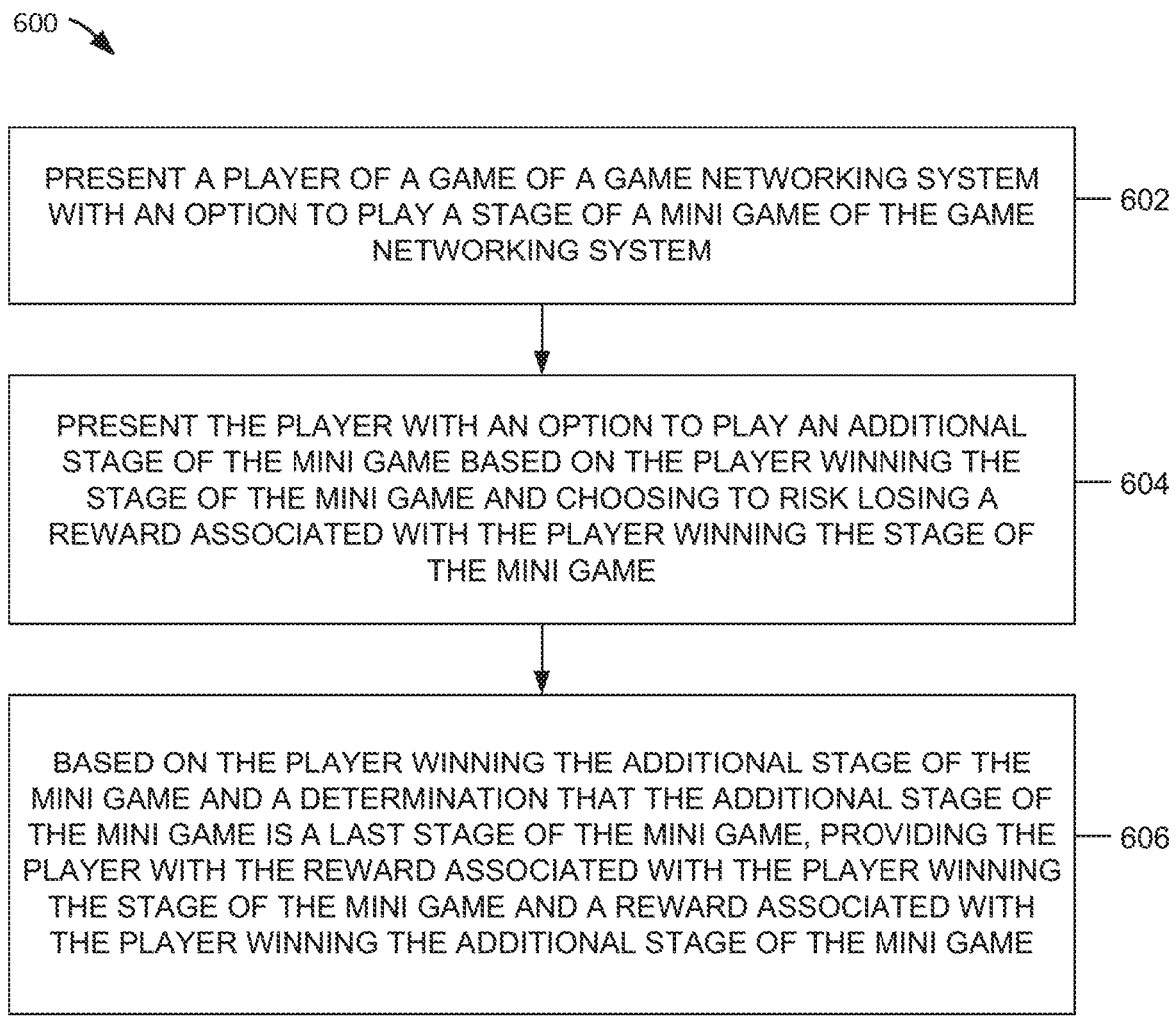
FIG. 6 is a flow chart illustrating an example embodiment of a method of providing rewards associated with multiple stages of a mini game based on a determination that a player has won the last stage of the mini game.

FIG. 6 is a flow chart of an example embodiment of a method 600 of providing rewards associated with multiple stages of a mini game based on a determination that a player has won the last stage of the mini game. At operation 602, the presentation module 204 presents a player of a game of a game networking system with an option to play a stage of a mini game of the game networking system.

At operation 604, the presentation module 204 presents the player with an option to play an additional stage of the mini game. In various embodiments, the presenting of the option to play in the additional stage of the mini game may be based on the player winning the stage of the mini game and choosing to risk losing a reward associated with the player winning the stage of the mini game.

At operation 606, the reward module 208 provides the player with a reward associated with the player winning the stage of the mini game and a reward associated with the player winning the additional stage of the mini game. In various embodiments, the providing of the rewards associated with multiple stages of the mini game is based on detection that the additional stage of the mini game is the last stage of the mini game.

Figure 7:
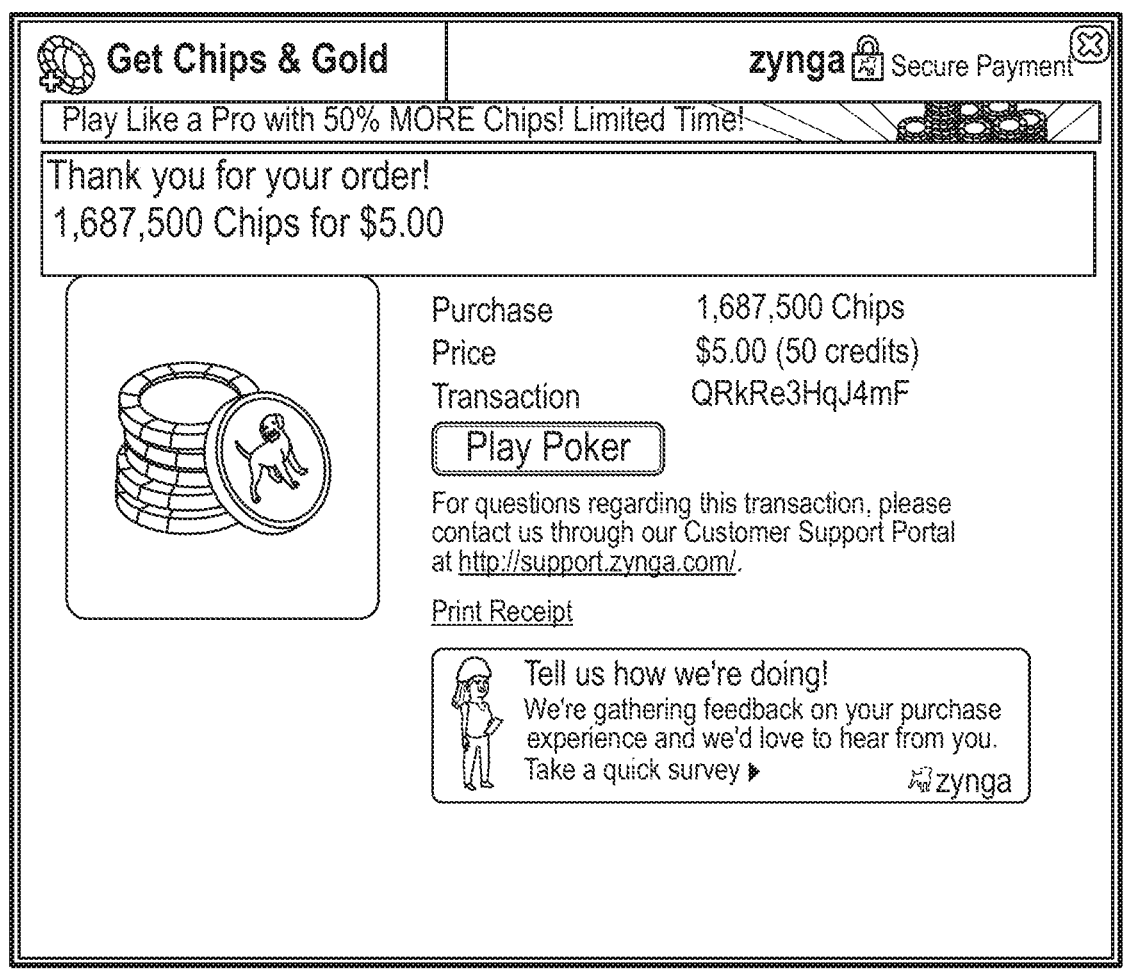
FIG. 7 is a screenshot illustrating an example embodiment of a user interface for confirming a purchase made by a player.

FIG. 7 is an example embodiment of a user interface 700 for confirming a purchase made by a player. In various embodiments, the presentation module 206 presents the user interface. The user interface may include information about the purchase, including a payment amount (e.g., $5.00), a description of the purchased item (e.g., 1,687,500 poker chips), a transaction identifier, and so on. The user interface may include a user interface control or element (e.g., a "Play Poker" button) that enables the player to start a game (e.g., a primary game). The game may pertain to the purchased item. For example, if the user purchases poker chips, the user interface may include a user interface element to enable the user to start a poker game in which he can use the poker chips.

Figure 8:
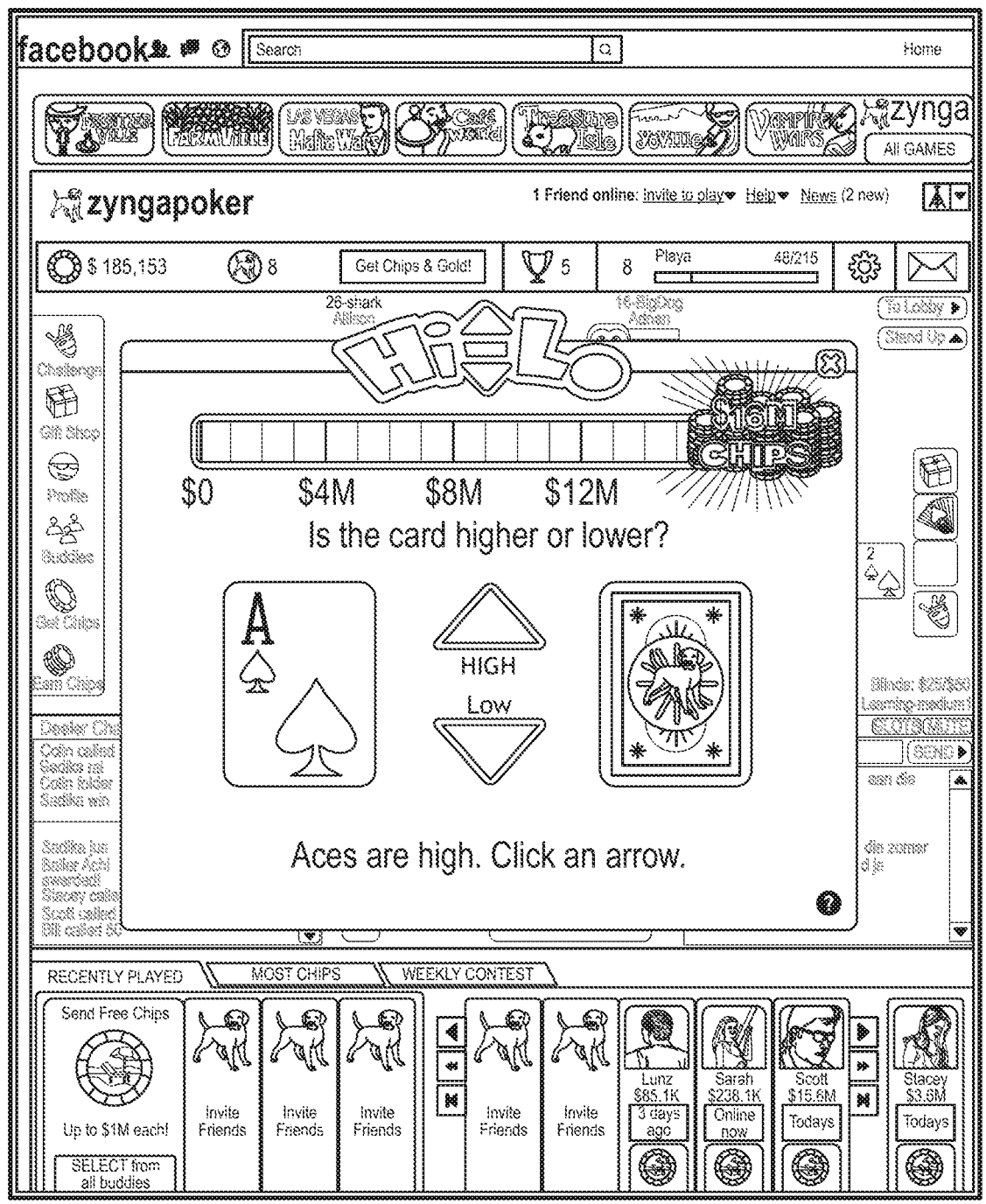
FIG. 8 is a screenshot illustrating an example embodiment of a user interface of a mini game.

FIG. 8 is an example embodiment of a user interface 800 of a mini game. In various embodiments, the initiation module 202 determines that the mini game should be presented to the user and presentation module 204 presents the user interface. For example, the initiation module 202 may determine that the mini game should be presented to the user based on the user making the purchase confirmed in the user interface 700 and activating the user interface element for starting a primary game associated with the purchase. In this case, the initiation module 202 may instruct the presentation module 204 to present the mini game to the user (e.g., overlaid over the primary game). In various embodiments, the mini game is a "Hi-Lo" game. The user may choose to play the Hi-Low game by clicking user interface elements (e.g., an up arrow or a down arrow) to indicate whether he thinks a hidden card is higher or lower than a shown card (e.g., an Ace). In various embodiments, an Ace is the highest card. In various embodiments, a tie is considered to be a loss. The user may choose to exit the Hi-Low game by clicking on a user interface element (e.g., an X icon in the upper-right corner of the main game window).

The user interface 800 includes a progress indicator. In various embodiments, the progress indicator shows possible stages of the mini game as well as rewards that are associated with the player winning each stage. Additionally, the progress indicator indicates parts of each stage of the mini game. For example, the progress indicator shows a first stage that includes four parts and a reward associated with the player winning the first stage of $4 million in virtual currency. The progress indicator is configured to indicate a progress of the player toward completing each stage of the mini game as well as a progress of the player toward completing the last stage of the mini game. Here, each part of a stage of a mini game may be a single hand of the Hi-Low game. If the player wins the first hand, the progress indicator shows that the player has won one-fourth of the first part of the mini game. In various embodiments, the player may not be offered a reward for completing a part of a stage of the mini game, but may be offered a reward for completing a stage of the mini game.

As depicted, the mini game is overlaid over a primary game (e.g., Zynga Poker), which is, in turn, embedded in a user interface of a social networking system (e.g., Facebook).

Figure 9:
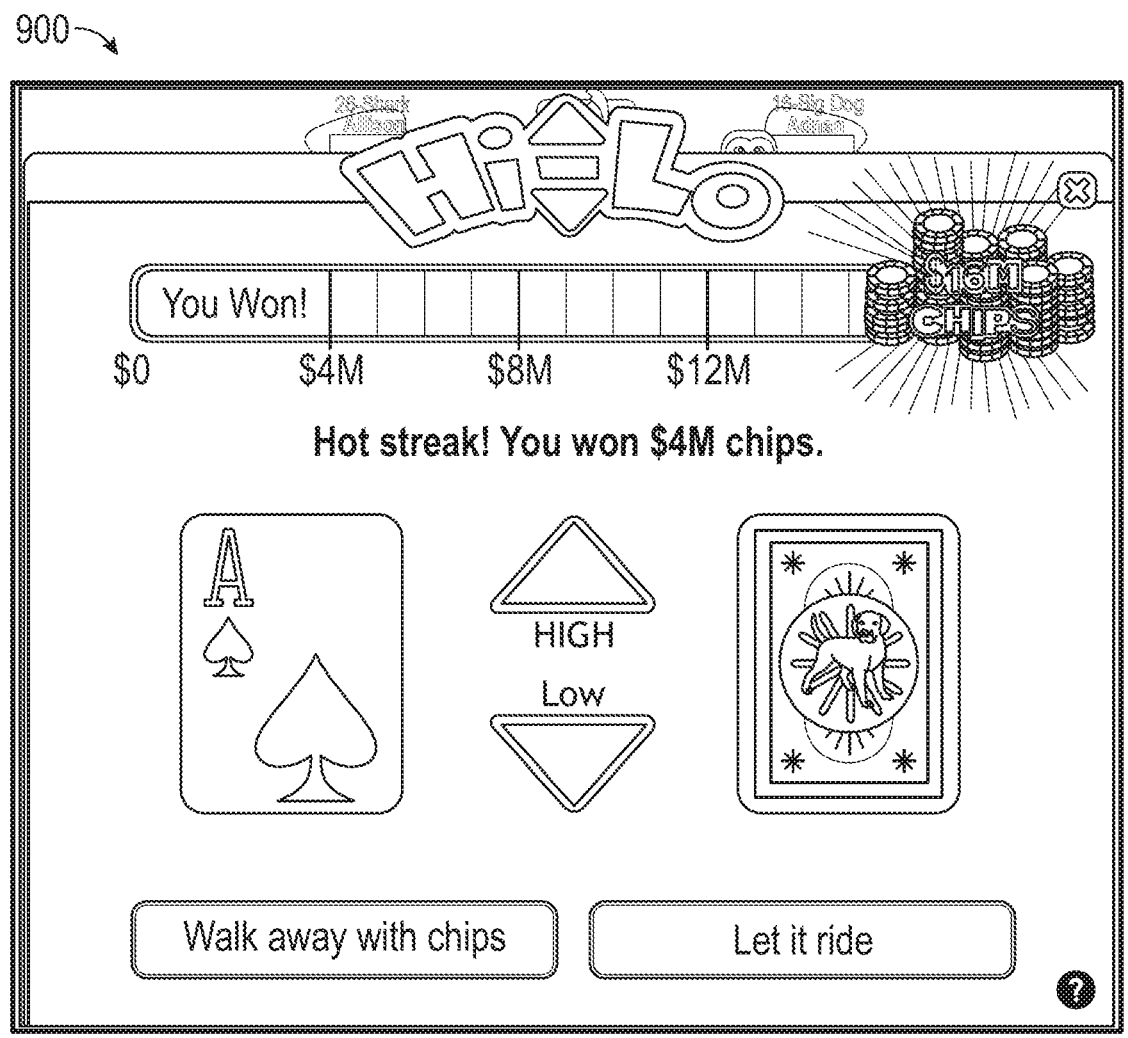
FIG. 9 is a screenshot illustrating an example embodiment of a user interface of a mini game in which the player has won a stage of the mini game.

FIG. 9 is an example embodiment of a user interface 900 of a mini game in which the player has won a stage of the mini game. Here, the progress indicator of the user interface 900 indicates that the user has completed all of the parts of the first stage of the mini game and that the user is entitled to receive the reward associated with winning the first stage of the mini game. The user interface 900 also includes user interface elements that enable the player to walk away (e.g., exit the mini game) with the reward or risk losing the reward by continuing to play the mini game (e.g., "Walk away with chips" or "Let it ride" buttons). In various embodiments, if the user chooses to continue playing the mini game, the user may not receive any rewards unless the user wins an additional stage of the mini game. Thus, if the user chooses to continue playing the mini game, but fails to win a part of the second stage of the mini game, the user may not receive the reward he previously earned for completing the first stage of the mini game.

Figure 10:
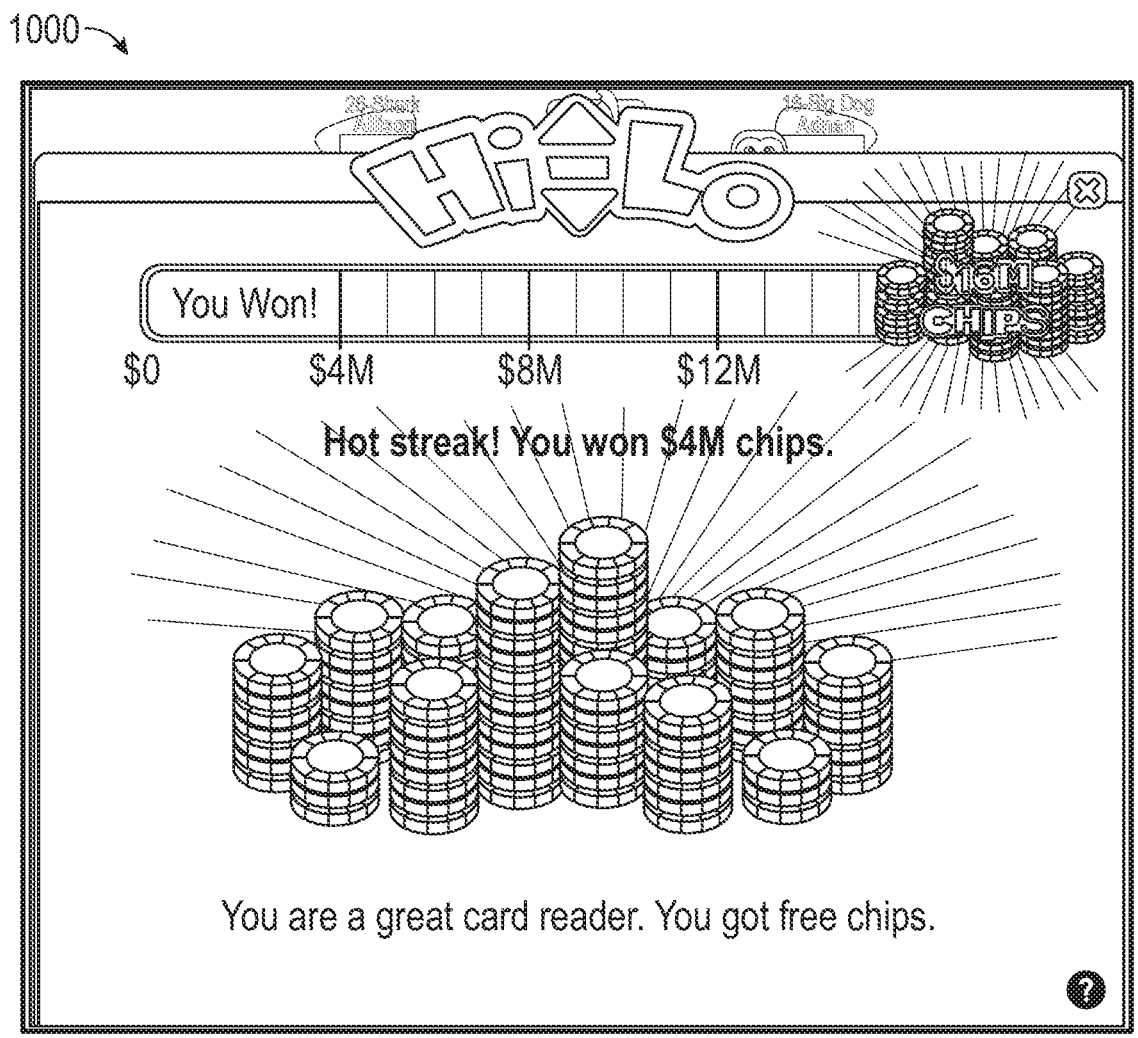
FIG. 10 is a screenshot illustrating an example embodiment of a user interface of a mini game.

FIG. 10 is an example embodiment of a user interface 1000 of a mini game in which the user has chosen to cash out his winnings from the mini game. The user interface 1000 depicts a progress of the user toward completing the mini game (e.g., that the user has completed four out of four parts of a first of four stages of the mini game). Additionally, the user interface 1000 displays a message confirming that the user has received the reward associated with completing the first stage of the mini game.

FIG. 11 is an example embodiment of a user interface 1100 of a "High/Low Casino Gold" mini game. The layout of the game includes card slots organized in a grid having five columns and four rows. Each row corresponds to a prize tier (or stage). In various embodiments, the user may only be able to access the High/Low Casino Gold mini game by spending virtual currency of a particular type (e.g., gold coins). In various embodiments, the mini game is surfaced (e.g., becomes available for playing by the user) when the player performs a particular action (e.g., making a purchase). In various embodiments, the reward or prize amount) increases significantly at each higher stages. For example, a first-tier prize may be $50K in poker chips, a second-tier prize may be $500K in poker chips, a third-tier prize may be $5 million in poker chips, and a fourth-tier prize may be $50 million in poker chips. Additionally, the prizes may vary based on a magnitude of a purchase (e.g., with casino gold or CG) made by the player.

Figure 12:
FIG. 12 is a screenshot illustrating an example embodiment of a user interface of the High/Low Casino Gold game in which some of the cards of the tiers have been revealed.

FIG. 12 is an example embodiment of a user interface 1200 of the High/Low Casino Gold game in which some of the cards of the tiers have been revealed. In various embodiments, the first card of each tier is revealed. The player must then correctly guess whether each remaining card in a tier is higher or lower than the first card of the tier. Or the player must correctly guess whether each remaining card is higher or lower than the preceding card.

In various embodiments, the player may not be able to collect a reward associated with a tier (other than the first tier) unless he clears the lower tier (e.g., guesses correctly for all of the cards in the lower tiers). In various embodiments, the cards of each tier of the High/Low Casino Gold game are dealt randomly from a standard 52-card deck.

In various embodiments, the player may be able to pay (e.g., with virtual currency, such as gold coins) to replace an incorrect guess. In various embodiments, the player may not have the option to replace an incorrect guess when playing on the last (highest) tier. In various embodiments, the player may not replace a guess more than once per tier. In various embodiments, the player may only be able to cash out winnings at the end of a tier. Furthermore, by choosing to continue to play an additional tier, the player may agree to put all previous winnings at risk. In various embodiments, the player may play tiers out of order, but may not be able to collect rewards for a particular tier unless he has completed (won) all of the parts of the lower tiers.

Figure 13:
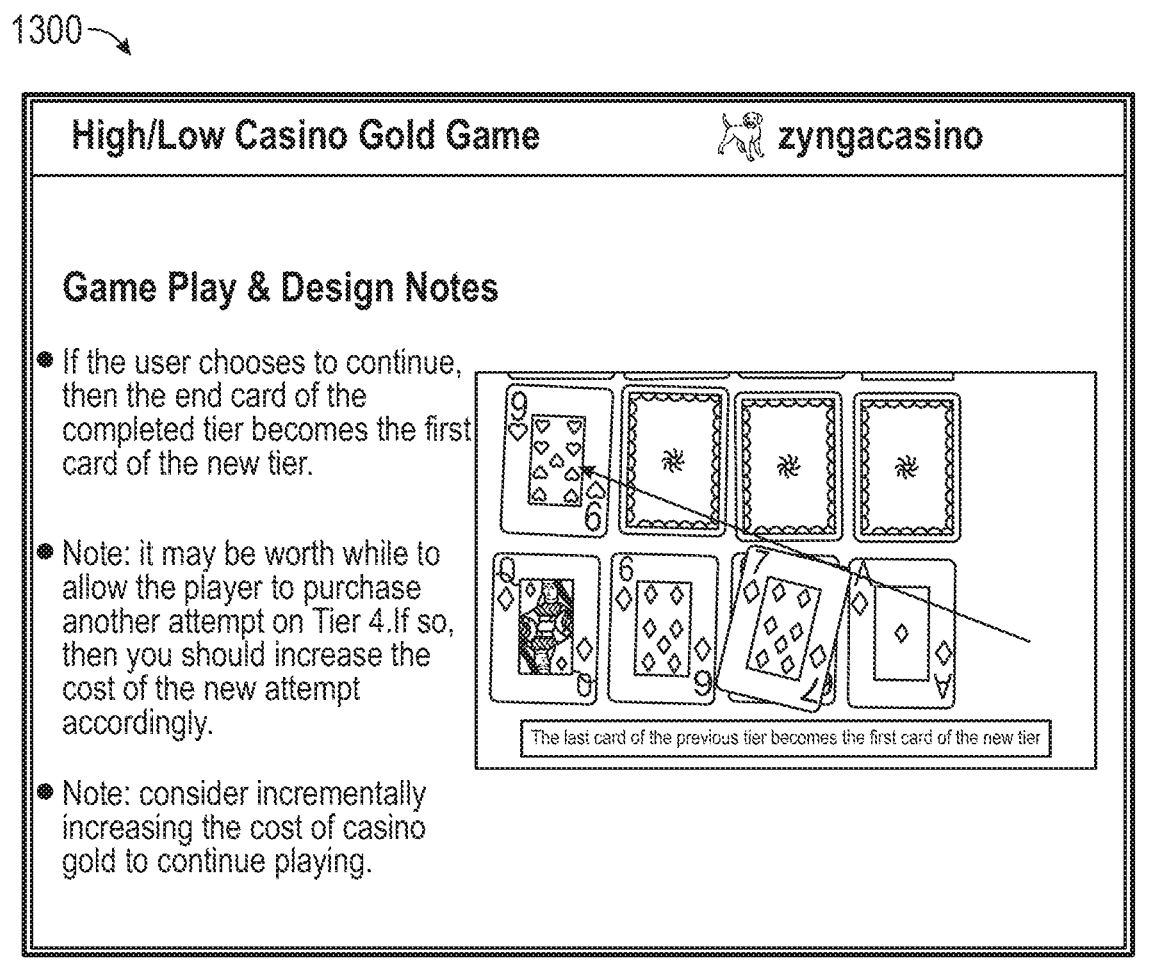

FIG. 13 is an example embodiment of a user interface 1300 of the High/Low Casino Gold game in which the last card of the previous tier becomes the first card of the new tier. In various embodiments, the player may be required to pay virtual currency to continue playing the game even after successfully completing a tier.

Figure 14:
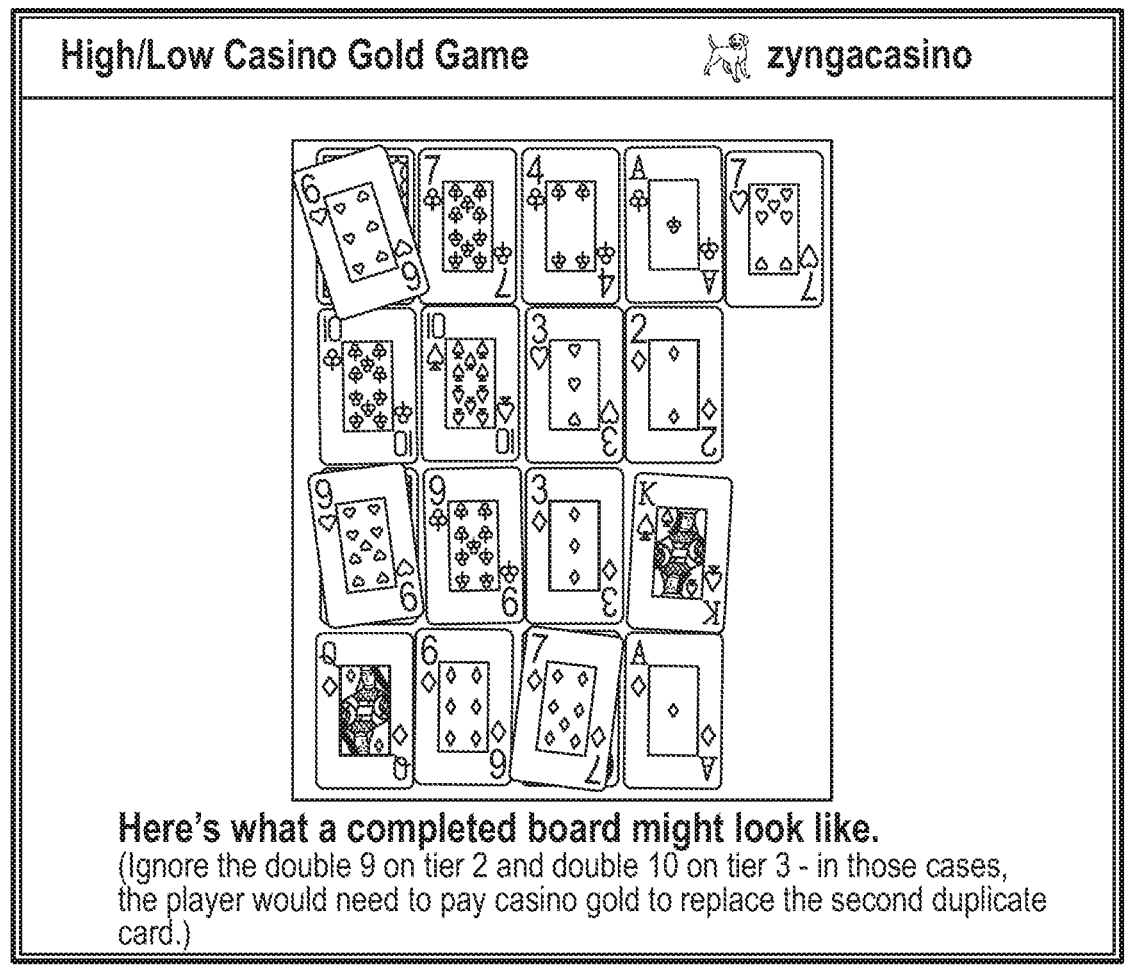
FIG. 14 is a screenshot illustrating an example embodiment of a user interface in which the player has won all of the tiers of the High/Low Casino Gold game.

FIG. 14 is an example embodiment of a user interface 1400 in which the player has won all of the tiers of the High/Low Casino Gold game. In this example, the player may have been required to pay virtual currency to replace the duplicate 9 on tier 2 and the duplicate 10 on tier 3. Note that the last card of each tier was moved up to the start of the next higher tier when the player continued to play the mini game. In various embodiments, upon completing the highest tier of the mini game, the player receives the maximum reward associated with the mini game. Furthermore, in various embodiments, the player may not access the mini game again until the user performs another qualifying action (e.g., purchasing additional virtual currency).

Data Flow

Figure 15:
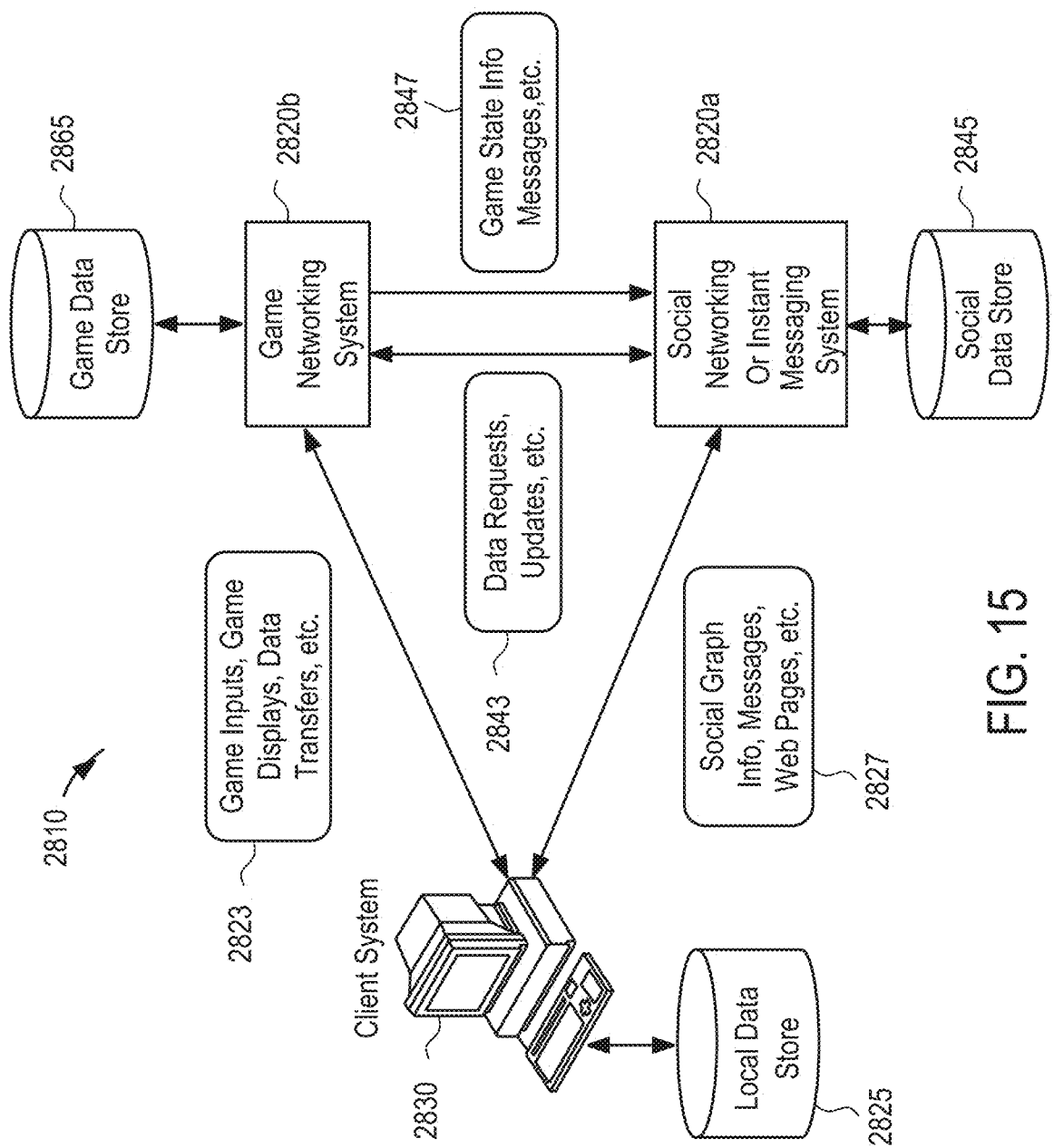
FIG. 15 is a block diagram illustrating an example data flow between the components of a system that may implement various example embodiments.

FIG. 15 is a block diagram illustrating an example data flow between the components of system 2810. In particular embodiments, system 2810 can include client system 2830, social networking system 2820a, and game networking system 2820b. The components of system 2810 can be connected to each other in any suitable configuration, using any suitable type of connection. The components may be connected directly or over any suitable network. Client system 2830, social networking system 2820a, and game networking system 2820b can each have one or more corresponding data stores such as local data store 2825, social data store 2845, and game data store 2865, respectively. Social networking system 2820a and game networking system 2820b can also have one or more servers that can communicate with client system 2830 over an appropriate network. Social networking system 2820a and game networking system 2820b can have, for example, one or more internet servers for communicating with client system 2830 via the Internet. Similarly, social networking system 2820a and game networking system 2820b can have one or more mobile servers for communicating with client system 2830 via a mobile network (e.g., GSM, PCS, Wi-Fi, WPAN, etc.). In some embodiments, one server may be able to communicate with client system 2830 over both the Internet and a mobile network. In other embodiments, separate servers can be used.

Client system 2830 can receive and transmit data 2823 to and from game networking system 2820b. This data can include, for example, webpages, messages, game inputs, game displays, HTTP packets, data requests, transaction information, updates, and other suitable data. At some other time, or at the same time, game networking system 2820b can communicate data 2843, 2847 (e.g., game state information, game system account information, page info, messages, data requests, updates, etc.) with other networking systems, such as social networking system 2820a (e.g., Facebook, Myspace, etc.). Client system 2830 can also receive and transmit data 527 to and from social networking system 2820a. This data can include, for example, webpages, messages, social graph information, social network displays, HTTP packets, data requests, transaction information, updates, and other suitable data.

Communication between client system 2830, social networking system 2820a, and game networking system 2820b can occur over any appropriate electronic communication medium or network using any suitable communications protocols. For example, client system 2830, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP and other communications protocols, such as HTTP-S, FTP, SNMP, TEL-NET, and a number of other protocols, may be used. In addition, a server in one interaction context may be a client in another interaction context. In particular embodiments, the information transmitted between hosts may be formatted as HTML documents. Other structured document languages or formats can be used, such as XML, and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

In particular embodiments, an instance of an online game can be stored as a set of game state parameters that characterize the state of various in-game objects, such as, for example, player character state parameters, non-player character parameters, and virtual item parameters. In particular embodiments, game state is maintained in a database as a serialized, unstructured string of text data as a so-called Binary Large Object (BLOB). When a player accesses an online game on game networking system 2820*b*, the BLOB containing the game state for the instance corresponding to the player can be transmitted to client system 2830 for use by a client-side executed object to process. In particular embodiments, the client-side executable may be a Flash-based game, which can de-serialize the game state data in the BLOB. As a player plays the game, the game logic implemented at client system 2830 maintains and modifies the various game state parameters locally. The client-side game logic may also batch game events, such as mouse clicks, and transmit these events to game networking system 2820*b*. Game networking system 2820*b* may itself operate by retrieving a copy of the BLOB from a database or an intermediate memory cache (memcache) layer. Game networking system 2820*b* can also de-serialize the BLOB to resolve the game state parameters and execute its own game logic based on the events in the batch file of events transmitted by the client to synchronize the game state on the server side. Game networking system 2820*b* may then re-serialize the game state, now modified, into a BLOB and pass this to a memory cache layer for lazy updates to a persistent database.

With a client-server environment in which the online games may run, one server system, such as game networking system 2820*b*, may support multiple client systems 2830. At any given time, there may be multiple players at multiple client systems 2830 all playing the same online game. In practice, the number of players playing the same game at the same time may be very large. As the game progresses with each player, multiple players may provide different inputs to the online game at their respective client systems 2830, and multiple client systems 2830 may transmit multiple player inputs and/or game events to game networking system 2820*b* for further processing. In addition, multiple client systems 2830 may transmit other types of application data to game networking system 2820*b*.

In particular embodiments, a computed-implemented game may be a text-based or turn-based game implemented as a series of web pages that are generated after a player selects one or more actions to perform. The web pages may be displayed in a browser client executed on client system 2830. As an example and not by way of limitation, a client application downloaded to client system 2830 may operate to serve a set of webpages to a player. As another example and not by way of limitation, a computer-implemented game may be an animated or rendered game executable as a stand-alone application or within the context of a webpage or other structured document. In particular embodiments, the computer-implemented game may be implemented using Adobe Flash-based technologies. As an example and not by way of limitation, a game may be fully or partially implemented as a SWF object that is embedded in a web page and executable by a Flash media player plug-in. In particular embodiments, one or more described webpages may be associated with or accessed by social networking system 2820*a*. This disclosure contemplates using any suitable application for the retrieval and rendering of structured documents hosted by any suitable network-addressable resource or website.

Application event data of a game is any data relevant to the game (e.g., player inputs). In particular embodiments, each application datum may have a name and a value, and the value of the application datum may change (i.e., be updated) at any time. When an update to an application datum occurs at client system 2830, either caused by an action of a game player or by the game logic itself, client system 2830 may need to inform game networking system 2820*b* of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies. For illustration purposes and not by way of limitation, system 2810 is discussed in reference to updating a multi-player online game hosted on a network-addressable system (such as, for example, social networking system 2820*a* or game networking system 2820*b*), where an instance of the online game is executed remotely on a client system 2830, which then transmits application event data to the hosting system such that the remote game server synchronizes the game state associated with the instance executed by the client system 2830.

In a particular embodiment, one or more objects of a game may be represented as an Adobe Flash object. Flash may manipulate vector and raster graphics, and supports bidirectional streaming of audio and video. "Flash" may mean the authoring environment, the player, or the application files. In particular embodiments, client system 2830 may include a Flash client. The Flash client may be configured to receive and run Flash applications or game object codes from any suitable networking system (such as, for example, social networking system 520*a* or game networking system 2820*b*). In particular embodiments, the Flash client may be run in a browser client executed on client system 2830. A player can interact with Flash objects using client system 2830 and the Flash client. The Flash objects can represent a variety of in-game objects. Thus, the player may perform various in-game actions on various in-game objects by making various changes and updates to the associated Flash objects. In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic may update one or more game state parameters associated with the in-game object. To ensure synchronization between the Flash object shown to the player at client system 2830, the Flash client may send the events that caused the game state changes to the in-game object to game networking system 2820*b*. However, to expedite the processing and hence the speed of the overall gaming experience, the Flash client may collect a batch of some number of events or updates into a batch file. The number of events or updates may be determined by the Flash client dynamically or determined by game networking system 2820*b* based on server loads or other factors. For example, client system 2830 may send a batch file to game networking system 2820*b* whenever 50 updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time in response to the game play of a player or in response to the game engine (e.g., based on the game logic). In particular embodiments, an application data update occurs when the value of a specific application datum is changed. In particular embodiments, each application event datum may include an action or event name and a value (such as an object identifier). Thus, each application datum may be represented as a name-value pair in the batch file. The batch file may include a collection of name-value pairs representing the application data that have been updated at client system 2830. In particular embodiments, the batch file may be a text file and the name-value pairs may be in string format.

In particular embodiments, when a player plays an online game on client system 2830, game networking system 2820*b* may serialize all the game-related data, including, for example and without limitation, game states, game events, and user inputs, for this particular user and this particular game into a BLOB and stores the BLOB in a database. The BLOB may be associated with an identifier that indicates that the BLOB contains the serialized game-related data for a particular player and a particular online game. In particular embodiments, while a player is not playing the online game, the corresponding BLOB may be stored in the database. This enables a player to stop playing the game at any time without losing the current state of the game the player is in. When a player resumes playing the game next time, game networking system 2820*b* may retrieve the corresponding BLOB from the database to determine the most-recent values of the game-related data. In particular embodiments, while a player is playing the online game, game networking system 2820*b* may also load the corresponding BLOB into a memory cache so that the game system may have faster access to the BLOB and the game-related data contained therein.

Systems and Methods

In particular embodiments, one or more described webpages may be associated with a networking system or networking service. However, alternate embodiments may have application to the retrieval and rendering of structured documents hosted by any type of network addressable resource or web site. Additionally, as used herein, a user may be an individual, a group, or an entity (such as a business or third party application).

Figure 16:
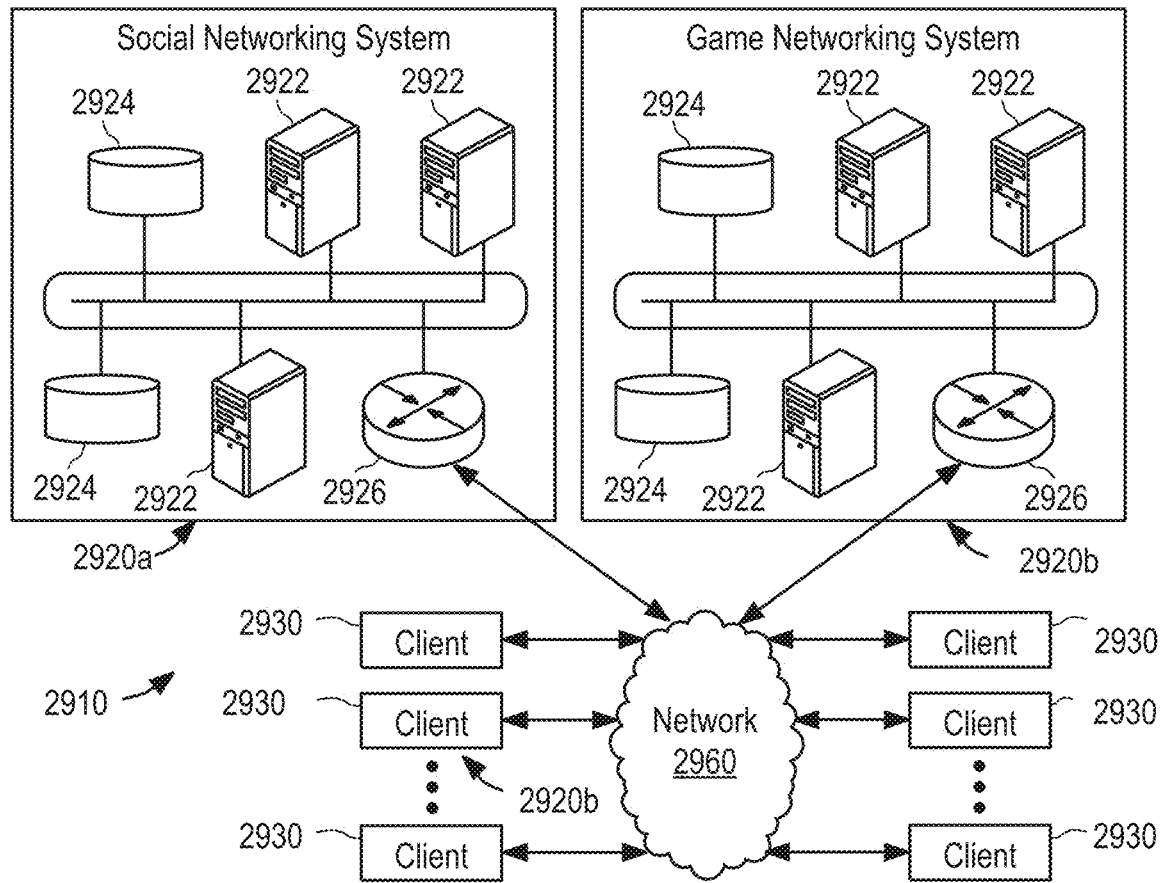
FIG. 16 is a block diagram illustrating an example network environment in which various example embodiments may operate.

Particular embodiments may operate in a wide area network environment, such as the Internet, including multiple network addressable systems. FIG. 16 is a block diagram illustrating an example network environment 2910, in which various example embodiments may operate. Network cloud 2960 generally represents one or more interconnected networks, over which the systems and hosts described herein can communicate. Network cloud 2960 may include packet-based WANs (such as the Internet), private networks, wireless networks, satellite networks, cellular networks, paging networks, and the like. As FIG. 29 illustrates, particular embodiments may operate in a network environment comprising one or more networking systems, such as social networking system 2920*a*, game networking system 2920*b*, and one or more client systems 2930. The components of social networking system 2920*a* and game networking system 2920*b* operate analogously; as such, hereinafter they may be referred to simply as networking system 2920. Client systems 2930 are operably connected to the network environment via a network service provider, a wireless carrier, or any other suitable means.

Networking system 2920 is a network addressable system that, in various example embodiments, comprises one or more physical servers 2922 and data stores 2924. The one or more physical servers 2922 are operably connected to computer network 2960 via, by way of example, a set of routers and/or networking switches 2926. In an example embodiment, the functionality hosted by the one or more physical servers 2922 may include web or HTTP servers, FTP servers, application servers, as well as, without limitation, webpages and applications implemented using Common Gateway Interface (CGI) script, PHP Hyper-text Preprocessor (PHP), Active Server Pages (ASP), HTML, XML, Java, JavaScript, Asynchronous JavaScript and XML (AJAX), Flash, ActionScript, and the like.

Physical servers 2922 may host functionality directed to the operations of networking system 2920. Hereinafter servers 2922 may be referred to as server 2922, although server 2922 may include numerous servers hosting, for example, networking system 2920, as well as other content distribution servers, data stores, and databases. Data store 2924 may store content and data relating to, and enabling, operation of networking system 2920 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 2924 corresponds to one or more of a variety of separate and integrated databases, such as relational databases and object-oriented databases, that maintain information as an integrated collection of logically related records or files stored on one or more physical systems. Structurally, data store 2924 may generally include one or more of a large class of data storage and management systems. In particular embodiments, data store 2924 may be implemented by any suitable physical system(s) including components, such as one or more database servers, mass storage media, media library systems, storage area networks, data storage clouds, and the like. In one example embodiment, data store 2924 includes one or more servers, databases (e.g., MySQL), and/or data warehouses. Data store 2924 may include data associated with different networking system 2920 users and/or client systems 2930.

Client system 2930 is generally a computer or computing device including functionality for communicating (e.g., remotely) over a computer network. Client system 2930 may be a desktop computer, laptop computer, personal digital assistant (PDA), in- or out-of-car navigation system, smart phone or other cellular or mobile phone, or mobile gaming device, among other suitable computing devices. Client system 2930 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client system 2930 to enter addresses of specific network resources to be retrieved, such as resources hosted by networking system 2920. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is HTML. Other common web browser-supported languages and technologies include XML, Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 2930 desires to view a particular webpage (hereinafter also referred to as a target structured document) hosted by networking system 2920, the user's web browser, or other document rendering engine or suitable client application, formulates and transmits a request to networking system 2920. The request generally includes a URL or other document identifier as well as metadata or other information. By way of example, the request may include information identifying the user, such as a user identifier (ID), as well as information identifying or characterizing the web browser or operating system running on the user's client computing device 2930. The request may also include location information identifying a geographic location of the user's client system or a logical network location of the user's client system. The request may also include a timestamp identifying when the request was transmitted.

Although the example network environment 2910 described above and illustrated in FIG. 16 described with respect to social networking system 2920*a* and game networking system 2920*b*, this disclosure encompasses any suitable network environment using any suitable systems. As an example and not by way of limitation, the network environment may include online media systems, online reviewing systems, online search engines, online advertising systems, or any combination of two or more such systems.

Figure 17:
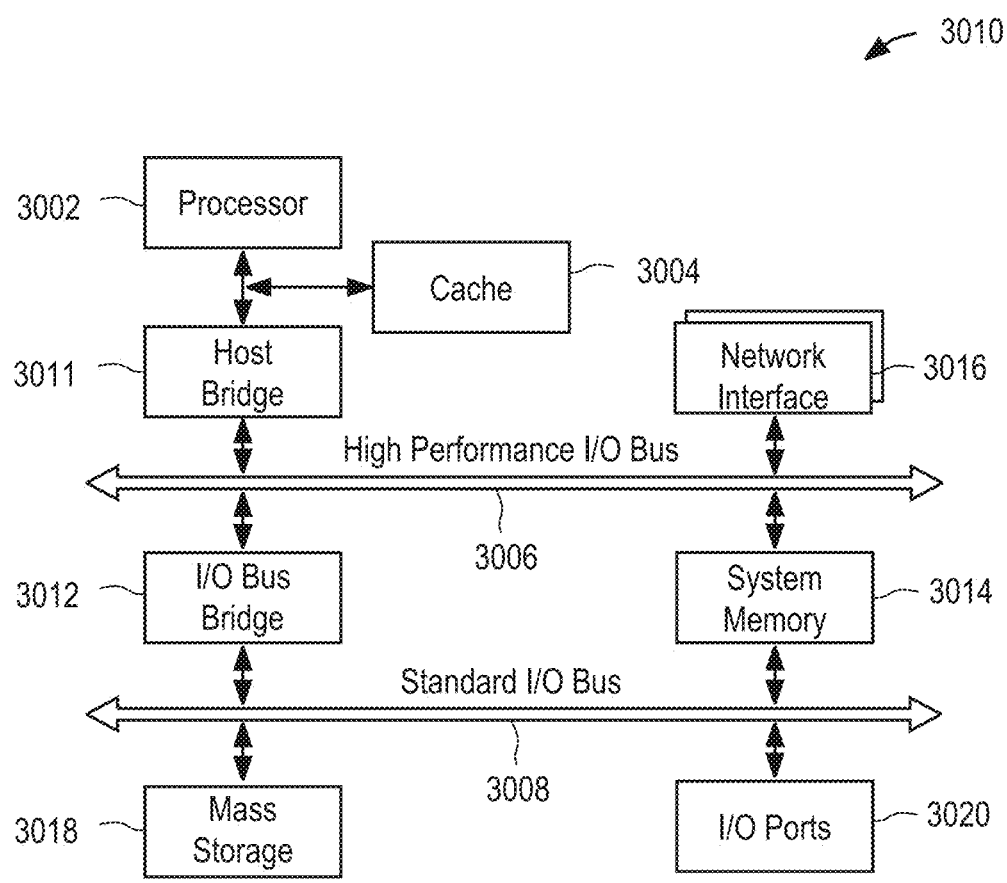
FIG. 17 is a block diagram illustrating an example computing system architecture that may be used to implement a server or a client system.

FIG. 17 is a block diagram illustrating an example computing system architecture, which may be used to implement a server 2922 or a client system 2930. In one embodiment, hardware system 3010 comprises a processor 3002, a cache memory 3004, and one or more executable modules and drivers, stored on a tangible computer readable medium, directed to the functions described herein. Additionally, hardware system 3010 may include a high performance input/output (I/O) bus 3006 and a standard I/O bus 3008. A host bridge 3011 may couple processor 3002 to high performance I/O bus 706, whereas I/O bus bridge 3012 couples the two buses 3006 and 3008 to each other. A system memory 3014 and one or more network/communication interfaces 3016 may couple to bus 3006. Hardware system 3010 may further include video memory (not shown) and a display device coupled to the video memory. Mass storage 3018 and I/O ports 3020 may couple to bus 3008. Hardware system 3010 may optionally include a keyboard, a pointing device, and a display device (not shown) coupled to bus 3008. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 3010 are described in greater detail below. In particular, network interface 3016 provides communication between hardware system 3010 and any of a wide range of networks, such as an Ethernet (e.g., IEEE 802.3) network, a backplane, and so forth. Mass storage 3018 provides permanent storage for the data and programming instructions to perform the above-described functions implemented in servers 2922, whereas system memory 3014 (e.g., DRAM) provides temporary storage for the data and programming instructions when executed by processor 3002. I/O ports 3020 are one or more serial and/or parallel communication ports that provide communication between additional peripheral devices, which may be coupled to hardware system 3010.

Hardware system 3010 may include a variety of system architectures and various components of hardware system 3010 may be rearranged. For example, cache 3004 may be on-chip with processor 3002. Alternatively, cache 3004 and processor 3002 may be packed together as a "processor module," with processor 3002 being referred to as the "processor core." Furthermore, certain embodiments of the present disclosure may not require nor include all of the above components. For example, the peripheral devices shown coupled to standard I/O bus 3008 may couple to high performance I/O bus 3006. In addition, in some embodiments, only a single bus may exist, with the components of hardware system 3010 being coupled to the single bus. Furthermore, hardware system 3010 may include additional components, such as additional processors, storage devices, or memories.

An operating system manages and controls the operation of hardware system 3010, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit. Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Miscellaneous

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding," "locating," "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, PDA, personal gaming device, etc.), that makes API calls directly to a server. Still further, while the embodiments described above operate with respect to a poker game, the embodiments can be applied to any game that includes multiple players. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A system comprising: one or more computer processors; one or more computer memories; a set of instructions incorporated into the one or more computer memories, the set of instructions configuring the one or more computer processors to perform operations for temporarily overlaying a user interface of a secondary game of a game networking system over a user interface of a primary game of the name networking system,
   the operations comprising: based on a determination that a criterion for initiating the secondary game has been satisfied, presenting a selectable user interface control to provide a player with an opportunity to access the secondary game;
   based on a selection of the selectable user interface control, performing the temporary overlaying of the secondary game over the primary game, the temporary overlaying including providing additional selectable user interface controls for playing the secondary game and for terminating the secondary game;
   and based on a determination that a criterion for terminating the secondary game has been satisfied, terminating the secondary game and automatically returning the player to the primary game,
   wherein the criterion for initiating the secondary game is that the player purchased a virtual asset having a value that transgresses a threshold value.

2. The system of claim 1, wherein the criterion for terminating the secondary game is that the player lost one of a plurality of stages of the secondary game.

3. The system of claim 1, wherein the criterion for terminating the secondary game is that the player selected one of the additional selectable user interface controls for terminating the secondary game, and wherein the operations further comprise presenting the selectable user interface control at a later time to provide the player with an additional opportunity to access the secondary game.

4. The system of claim 3, wherein the secondary game is not accessible by the player again until the criteria for initiating the secondary game has been satisfied again.

5. The system of claim 1, wherein the secondary game has a plurality of stages and a user interface of the secondary game includes a depiction of a progress toward a completion of each of the stages by the player.

6. The system of claim 1, wherein the depiction of the progress includes a reward amount earned by the player for completing a stage of the plurality of stages as well as reward amounts available to the player based on the player completing additional stages of the plurality of stages.

7. A method comprising: performing operations for temporarily overlaying a user interface of a secondary game of a game networking system over a user interface of a primary game of the game networking system, the operations comprising:
   based on a determination that a criterion for initiating the secondary game has been satisfied, presenting a selectable user interface control to provide a player with an opportunity to access the secondary game;
   based on a selection of the selectable user interface control, performing the temporary overlaying of the secondary game over the primary game, the temporary overlaying including providing additional selectable user interface controls for playing the secondary game and for terminating the secondary game; and
   based on a determination that a criterion for terminating the secondary game has been satisfied, terminating the secondary game and returning the player to the primary game,
   wherein the criterion for initiating the secondary game is that the player purchased a virtual asset having a value that transgresses a threshold value.

8. The method of claim 7, wherein the criterion for terminating the secondary game is that the player lost one of a plurality of stages of the secondary game.

9. The method of claim 7, wherein the criterion for terminating the secondary game is that the player selected one of the additional selectable user interface controls for terminating the secondary game, and wherein the operations further comprise presenting the selectable user interface control at a later time to provide the player with an additional opportunity to access the secondary game.

10. The method of claim 9, wherein the secondary game is not accessible by the player again until the criteria for initiating the secondary game has been satisfied again.

11. The method of claim 7, wherein the secondary game has a plurality of stages and a user interface of the secondary game includes a depiction of a progress toward a completion of each of the stages by the player.

12. The method of claim 7, wherein the depiction of the progress includes a reward amount earned by the player for completing a stage of the plurality of stages as well as reward amounts available to the player based on the player completing additional stages of the plurality of stages.

13. A non-transitory machine readable storage medium storing a set of instructions that, when executed by at least one processor, causes the at least one processor to perform operations performing operations for temporarily overlaying a user interface of a secondary game of a game networking system over a user interface of a primary game of the game networking system,
the operations comprising: based on a determination that a criterion for initiating the secondary game has been satisfied, presenting a selectable user interface control to provide a player with an opportunity to access the secondary game;
based on a selection of the selectable user interface control, performing the temporary overlaying of the secondary game over the primary game, the temporary overlaying including providing additional selectable user interface controls for playing the secondary game and for terminating the secondary game; and
based on a determination that a criterion for terminating the secondary game has been satisfied, terminating the secondary game and returning the player to the primary game,
wherein the criterion for initiating the secondary game is that the player purchased a virtual asset having a value that transgresses a threshold value.

14. The method of claim 12, wherein the criterion for terminating the secondary game is that the player lost one of a plurality of stages of the secondary game.

15. The method of claim 13, wherein the criterion for terminating the secondary game is that the player selected one of the additional selectable user interface controls for terminating the secondary game, and wherein the operations further comprise presenting the selectable user interface control at a later time to provide the player with an additional opportunity to access the secondary game.

16. The method of claim 15, wherein the secondary game is not accessible by the player again until the criteria for initiating the secondary game has been satisfied again.

17. The method of claim 13, wherein the secondary game has a plurality of stages and a user interface of the secondary game includes a depiction of a progress toward a completion of each of the stages by the player.

* * * * *

UNITED STATES PATENT AND TRADEMARK OFFICE
CERTIFICATE OF CORRECTION

PATENT NO. : 10,507,380 B2
APPLICATION NO. : 16/051159
DATED : December 17, 2019
INVENTOR(S) : Nowak et al.

It is certified that error appears in the above-identified patent and that said Letters Patent is hereby corrected as shown below:

On the Title Page

On page 2, in Column 2, item (56) under "Other Publications", Line 29, delete "13 708,568," and insert --13/708,568,-- therefor In the Drawings Sheet 6 of 17, Fig. 6, reference numeral 602, Line 1, delete "OF A GAME OF A GAME" and insert --OF A GAME-- therefor In the Specification In Column 2, Line 17, after "DRAWINGS", insert --¶The patent or application file contains at least one drawing executed in color. Copies of this patent or patent application publication with color drawing(s) will be provided by the Office upon request and payment of the necessary fee.--

In Column 7, Line 15, delete "graph," and insert --graph;-- therefor

In Column 10, Line 13, delete "206" and insert --204-- therefor

In Column 10, Line 18, delete "206" and insert --204-- therefor

In Column 10, Line 26, delete "206" and insert --204-- therefor

In Column 11, Line 35, delete "206" and insert --204-- therefor

In Column 16, Line 26, delete "520a" and insert --2820a-- therefor

Signed and Sealed this
Eighth Day of February, 2022

Drew Hirshfeld
*Performing the Functions and Duties of the
Under Secretary of Commerce for Intellectual Property and
Director of the United States Patent and Trademark Office*

In the Claims

In Column 24, Line 4, in Claim 14, delete "claim 12," and insert --claim 13,-- therefor